(12) United States Patent
Hanada et al.

(10) Patent No.: US 10,000,609 B2
(45) Date of Patent: Jun. 19, 2018

(54) SELF-CROSSLINKING POLYSILOXANE-MODIFIED POLYHYDROXY POLYURETHANE RESIN, RESIN MATERIAL CONTAINING SAME, METHOD FOR PRODUCING SAME, ARTIFICIAL LEATHER COMPRISING SAME, AND THERMOPLASTIC POLYOLEFIN SKIN MATERIAL COMPRISING SAME

(75) Inventors: Kazuyuki Hanada, Tokyo (JP); Kazuya Kimura, Tokyo (JP); Kenichi Takahashi, Tokyo (JP); Osamu Kawakami, Tokyo (JP); Manabu Uruno, Tokyo (JP)

(73) Assignees: DAINICHISEIKA COLOR & CHEMICALS MFG. CO., LTD., Tokyo (JP); UKIMA CHEMICALS & COLOR MFG. CO., LTD., Tokyo (JP)

( * ) Notice: Subject to any disclaimer, the term of this patent is extended or adjusted under 35 U.S.C. 154(b) by 1011 days.

(21) Appl. No.: 13/818,552

(22) PCT Filed: Aug. 11, 2011

(86) PCT No.: PCT/JP2011/068342
§ 371 (c)(1),
(2), (4) Date: Mar. 19, 2013

(87) PCT Pub. No.: WO2012/026338
PCT Pub. Date: Mar. 1, 2012

(65) Prior Publication Data
US 2013/0171896 A1   Jul. 4, 2013

(30) Foreign Application Priority Data

Aug. 26, 2010 (JP) .................................. 2010-189774
Dec. 22, 2010 (JP) .................................. 2010-286620
Jan. 12, 2011 (JP) .................................. 2011-004281

(51) Int. Cl.
*C08G 71/04* (2006.01)
*C08G 18/61* (2006.01)
(Continued)

(52) U.S. Cl.
CPC ............. *C08G 71/04* (2013.01); *C08G 18/61* (2013.01); *C08G 18/792* (2013.01);
(Continued)

(58) Field of Classification Search
None
See application file for complete search history.

(56) References Cited

U.S. PATENT DOCUMENTS 3,072,613 A    1/1963 Whelan, Jr. et al.
4,299,868 A   11/1981 Gerhard et al.
(Continued)

FOREIGN PATENT DOCUMENTS

EP    390777    10/1990
EP   1143063    10/2001
(Continued)

OTHER PUBLICATIONS

Zhu et al.: "New polysiloxanes bearing cyclic carbonate side chains: synthesis and ionic conductivity studies"; Polymer Preprints (1994) vol. 35, No. 1, p. 496-497—2 pages.
(Continued)

*Primary Examiner* — Chinessa T. Golden
(74) *Attorney, Agent, or Firm* — Hamre, Schumann, Mueller & Larson, P.C.

(57) ABSTRACT

Provided are a self-crosslinking polysiloxane-modified polyhydroxy polyurethane resin derived from a reaction of a 5-membered cyclic carbonate polysiloxane compound represented by the following formula (1) and an amine compound and having polysiloxane segments and masked isocyanate groups in its structure:

$$A-R_2-\underset{\underset{CH_3}{|}}{\overset{\overset{CH_3}{|}}{Si}}O(SiO)_a\underset{\underset{CH_3}{|}}{\overset{\overset{CH_3}{|}}{Si}}-R_2-A \quad (1)$$

wherein A means $$-R_1-CH-CH_2 \atop \underset{O}{\underset{\|}{\underset{C}{\diagdown}}}\underset{O}{\diagup} \quad \text{or} \quad -R_1-\underset{\underset{O}{\underset{\|}{\underset{C}{\diagdown}}}\underset{O}{\diagup}}{\overset{H}{\diagdown}},$$

and its production process. The present invention can provide a polyhydroxy polyurethane resin, the development of applications of which has not moved ahead in the prior art, as a novel self-crosslinking polyhydroxy polyurethane resin that enables to provide products excellent in lubricity, abrasion resistance, chemical resistance, non-tackiness, heat resistance and the like, is useful from the viewpoint of the reduction of warming gas, and is responsive to the environment.

16 Claims, No Drawings

(51) Int. Cl.
  C08G 18/79  (2006.01)
  C08G 18/80  (2006.01)
  C08J 7/04  (2006.01)
  D06N 3/12  (2006.01)
  D06N 3/14  (2006.01)

(52) U.S. Cl.
  CPC ..... *C08G 18/8025* (2013.01); *C08G 18/8029* (2013.01); *C08G 18/8074* (2013.01); *C08G 18/8077* (2013.01); *C08J 7/042* (2013.01); *C08J 7/047* (2013.01); *D06N 3/128* (2013.01); *D06N 3/14* (2013.01); *C08J 2323/02* (2013.01); *C08J 2423/28* (2013.01); *C08J 2475/04* (2013.01); *D06N 2211/28* (2013.01); *Y10T 428/249921* (2015.04); *Y10T 428/31587* (2015.04); *Y10T 442/20* (2015.04)

(56) References Cited

U.S. PATENT DOCUMENTS

| | | | |
|---|---|---|---|
| 4,480,009 | A | 10/1984 | Berger |
| 4,484,994 | A | 11/1984 | Jacobs et al. |
| 4,499,149 | A | 2/1985 | Berger |
| 4,520,167 | A | 5/1985 | Blank et al. |
| 4,631,320 | A | 12/1986 | Parekh et al. |
| 4,758,632 | A | 7/1988 | Parekh et al. |
| 4,806,611 | A | 2/1989 | Honel et al. |
| 4,883,854 | A | 11/1989 | Coury et al. |
| 4,895,829 | A | 1/1990 | Hanada et al. |
| 4,897,435 | A | 1/1990 | Jacobs et al. |
| 4,910,087 | A | 3/1990 | Torii et al. |
| 5,237,021 | A | 8/1993 | Ishii et al. |
| 5,324,797 | A | 6/1994 | Ishii et al. |
| 5,606,077 | A | 2/1997 | Lersch et al. |
| 5,686,547 | A | 11/1997 | Nye |
| 6,120,905 | A | 9/2000 | Figovsky |
| 6,379,751 | B1 | 4/2002 | Shäfer et al. |
| 6,784,300 | B2 | 8/2004 | Cetin et al. |
| 2003/0198819 | A1* | 10/2003 | Reusmann ......... C08G 18/0823 428/447 |
| 2006/0276599 | A1 | 12/2006 | DeWitt et al. |
| 2007/0059597 | A1* | 3/2007 | Nakanishi .............. C08G 77/04 429/188 |
| 2007/0134502 | A1 | 6/2007 | Fonda |
| 2007/0135588 | A1 | 6/2007 | Diakoumakos et al. |
| 2008/0026154 | A1 | 1/2008 | Jones et al. |
| 2009/0018302 | A1 | 1/2009 | Laas et al. |
| 2010/0210809 | A1 | 8/2010 | Simon et al. |
| 2011/0039948 | A1 | 2/2011 | Lange et al. |
| 2012/0231184 | A1 | 9/2012 | Hanada et al. |
| 2012/0232289 | A1 | 9/2012 | Hanada et al. |
| 2012/0237701 | A1 | 9/2012 | Hanada et al. |
| 2014/0024274 | A1 | 1/2014 | Hanada et al. |

FOREIGN PATENT DOCUMENTS

| | | |
|---|---|---|
| EP | 2102286 | 9/2009 |
| EP | 2505600 | 10/2012 |
| EP | 2610776 | 7/2013 |
| JP | 56-4408 | 1/1981 |
| JP | 58-13359 B | 3/1983 |
| JP | 61-227087 | 10/1986 |
| JP | 62-202786 | 9/1987 |
| JP | 63-166854 | 7/1988 |
| JP | 2-102096 | 4/1990 |
| JP | 3-501121 | 3/1991 |
| JP | 5-65341 | 3/1993 |
| JP | 06-025604 | 2/1994 |
| JP | 06-247151 | 9/1994 |
| JP | 7-10991 | 1/1995 |
| JP | 8-109349 | 4/1996 |
| JP | 8-225670 | 9/1996 |
| JP | 8-245787 | 9/1996 |
| JP | 8-245791 | 9/1996 |
| JP | 9-278982 | 10/1997 |
| JP | 10-67857 | 3/1998 |
| JP | 10-251405 | 9/1998 |
| JP | 11-140182 | 5/1999 |
| JP | 2000-319504 | 11/2000 |
| JP | 2001-234071 | 8/2001 |
| JP | 2002-114936 | 4/2002 |
| JP | 2002-518532 | 6/2002 |
| JP | 2004-051901 | 2/2004 |
| JP | 2005-154580 | 6/2005 |
| JP | 2005-336637 | 12/2005 |
| JP | 2006-176615 | 7/2006 |
| JP | 2006-307015 | 11/2006 |
| JP | 2006-336015 | 12/2006 |
| JP | 2007-501886 | 2/2007 |
| JP | 2007-77075 | 3/2007 |
| JP | 2007-270373 | 10/2007 |
| JP | 2007-297544 | 11/2007 |
| JP | 2008-502765 | 1/2008 |
| JP | 2008-56772 | 3/2008 |
| JP | 2008-297552 | 12/2008 |
| JP | 2009-30050 | 2/2009 |
| JP | 2009-520082 | 5/2009 |
| JP | 2009-144313 | 7/2009 |
| JP | 2009-155407 | 7/2009 |
| JP | 2010-180363 | 8/2010 |
| JP | 2011-132509 | 7/2011 |
| KR | 1986-0002192 B | 12/1986 |
| WO | WO 1989/000565 | 1/1989 |
| WO | WO 2008/142109 | 11/2008 |
| WO | WO 2009/112418 | 9/2009 |
| WO | WO 2009112418 A1 * | 9/2009 ............ C08G 71/04 |
| WO | WO 2011/065129 | 6/2011 |
| WO | WO 2011/065432 | 6/2011 |
| WO | WO 2011/065433 | 6/2011 |
| WO | WO 2011/162237 | 12/2011 |
| WO | WO 2012/026338 | 3/2012 |

OTHER PUBLICATIONS

Zhu et al.: "Synthesis of Polysiloxanes Bearing Cyclic Carbonate Side Chains. Dielectric Properties and Ionic Conductivities of Lithium Triflate Complexes"; Macromolecules (1994) vol. 27, No. 15, p. 4076-4079—4 pages.

Lang et al.(2009): STN International HCAPLUS database, Columbus (OH), accession No. 2009: 1141958.

Kihara et al.: "Catalytic Activity of Various Salts in the Reaction of 2,3-Epoxypropyl Phenyl Ether and Carbon Dioxide under Atmospheric Pressure"; J. Org. Chem, 1993, 58, pp. 6198-6202.

Kihara et al.: "Synthesis and Properties of Poly (hydroxyurethane)s"; Journal of Polymer Science: Part a: Polymer Chemistry, vol. 31(11), pp. 2765-2773 (1993).

Extended European Search Report, dated Mar. 25, 2015; European Patent Application No. 11798121.7 (4 pages).

Extended European Search Report, issued in the corresponding European Patent Application No. 11819802.7, dated Oct. 25, 2016, 5 pages.

Indian Office Action, issued in the corresponding Indian Patent Application No. 370/KOLNP/2013, dated Jul. 28, 2017, 5 pages.

* cited by examiner

SELF-CROSSLINKING POLYSILOXANE-MODIFIED POLYHYDROXY POLYURETHANE RESIN, RESIN MATERIAL CONTAINING SAME, METHOD FOR PRODUCING SAME, ARTIFICIAL LEATHER COMPRISING SAME, AND THERMOPLASTIC POLYOLEFIN SKIN MATERIAL COMPRISING SAME

TECHNICAL FIELD

This invention relates, in a first aspect thereof, to a novel self-crosslinking polysiloxane-modified polyhydroxy polyurethane resin, a resin material containing the resin and a production process of the resin. More specifically, the present invention is concerned, in the first aspect thereof, with a technology on a self-crosslinking polysiloxane-modified polyhydroxy polyurethane resin, which can provide products excellent in lubricity, abrasion resistance, chemical resistance, non-tackiness and heat resistance when employed as a base material for film and molding materials, various coating materials, diverse binders and the like, and moreover, which is also useful from the viewpoint of preventing destruction of the global environment because carbon dioxide is used as a production raw material and can be fixed in the resin.

The present invention also relates, in a second aspect thereof, to an imitation leather obtained by using a resin composition containing the above-described self-crosslinking polysiloxane-modified polyhydroxy polyurethane resin as a principal component, and more specifically to an imitation leather excellent in hand feeling, lubricity, scratch resistance, abrasion resistance, chemical resistance and heat resistance, and moreover, useful from the viewpoint of preventing destruction of the global environment because the resin used as the principal component can fix carbon dioxide in its structure.

The present invention also relates, in a third aspect thereof, to a skin material, which is made of a thermoplastic polyolefin resin and is useful in a car interior trim material, home electric appliance component or part, or the like. Specifically, the present invention is also concerned, in the third aspect thereof, with a skin material made of a thermoplastic polyolefin resin. Owing to the use of the above-described self-crosslinking polysiloxane-modified polyhydroxy polyurethane resin in the formation of a top coat layer for the skin material, the skin material is excellent in scratch resistance, abrasion resistance, chemical resistance and heat resistance, and in a preferred embodiment, the top coat layer can be provided as a uniform matte film.

BACKGROUND ART

Polyhydroxy polyurethane resins, which make use of carbon dioxide as a production raw material, are known for some time (see, for example, Patent Documents 1 and 2). Under the current situation, however, the development of their applications has not moved ahead, because these polyhydroxy polyurethane resins are evidently inferior in characteristics to polyurethane-based resins comparable as high-molecular compounds of similar type.

On the other hand, the global warming phenomenon which can be considered to be attributable to the ever-increasing emission of carbon dioxide has become a worldwide problem in recent years, and a reduction in carbon dioxide emissions has arisen as a critical issue for the entire world. The change to renewable resources such as biomass and methane has also become a worldwide technological trend from the viewpoint of the problem of exhaustible fossil resources (petroleum) (for example, Non-patent Documents 1 and 2).

Under the above-described background, the present inventors put a fresh look on the above-described polyhydroxy polyurethane resins, and have come to realize that the provision of a technology capable of enabling the development of applications of these resins is very effective. Described specifically, carbon dioxide which is a raw material for such polyhydroxy polyurethane resins is a readily-available and sustainable carbon resource, and the provision of a technology that makes effective use of a plastic, in which carbon dioxide used as a raw material is fixed, is considered to find utility as an effective means for resolving serious problems such as warming, resource depletion and the like which the earth confronts in recent years. The use, if possible, of a polyhydroxy polyurethane resin, which contains carbon dioxide fixed therein, in the below-described products with imitation leathers or skin materials employed therein will be extremely effective because these products are used in large quantities.

(Imitation Leathers)

Conventionally, imitation leathers have been used in pouches, bags, shoes, furniture, clothing, vehicle interior trim materials, electric appliances, and the like. As resins for these imitation leathers, polyurethane-based resins are widely used. The term "imitation leather" is a generic term for leather-like products manufactured resembling natural leathers. In general, imitation leathers can be roughly divided into artificial leathers, synthetic leathers, and vinyl chloride leathers.

Artificial leathers have a structure closest to that of natural leathers among imitation leathers, and use a non-woven fabric as a base fabric. As a process for the production of a general artificial leather, there is a process to be described hereinafter. After a nonwoven fabric is first impregnated with a solution of a polyurethane-based resin in dimethyl-formamide (hereinafter abbreviated as "DMF"), the polyurethane-based resin is solidified and dried into a porous form by wet-process film formation (submerged solidification). Subsequently, its surface is further coated with a polyurethane-based resin or provided with a laminated layer of the polyurethane-based resin to present a smooth tone, or its surface is ground to raise fibers such that a suede tone is presented.

On the other hand, synthetic leathers use, as a base fabric, a fabric such as a woven fabric or raised blanket, and in general, are roughly divided into dry-process synthetic leathers and wet-process synthetic leathers depending upon a difference in production process. For the production of a dry-process synthetic leather, there are two processes, one being to coat a polyurethane-based resin directly on a base fabric and to dry it, and the other to coat a polyurethane-based resin on a sheet of release paper, to dry the polyurethane-based resin into a film, and then to bond the film and a base fabric together with an adhesive. On the other hand, a wet-process synthetic leather can be produced by impregnating or coating a base fabric with the above-mentioned solution of the polyurethane-based resin in DMF and then subjecting the polyurethane-based resin to submerged solidification and drying to form a porous layer. Further, the surface of the synthetic leather obtained by the dry process or wet process as described above is coated or laminated with a polyurethane-based resin to provide a layer such that a smooth tone is presented, or the surface is ground to raise fibers such that a suede tone is presented.

As mentioned above, the reduction of carbon dioxide emissions has become a critical worldwide issue. In the field of imitation leathers, more and more makers are also positively working on environmental measures, resulting in a move toward forming imitation leather products by using materials excellent in environmental conservation properties. A great deal of research is hence under way, for example, to reduce VOC (volatile organic compound) emissions as much as possible by using polyurethane-based resins, which are dispersible or emulsifiable in water-based media, in place of polyurethane resins that use an organic solvent, or to use plant-derived raw materials from the viewpoint of carbon neutral. However, the resulting imitation leather products are still different in performance compared with the conventional products, and therefore, are considered to have problems for practical applications. Moreover, these approaches are still insufficient in respect to the realization of the conservation of the current environment on the global scale (Patent Documents 3 to 5).

(Skin Materials Made of Thermoplastic Polyolefin Resins)

Concerning vehicle interior trim materials (instrument panels, door trims, etc.) and home electric appliance components and parts, the recycling of their constituent members is strongly desired to decrease waste materials as much as possible after use in view of the worsening garbage-related problems and environment-related problems in recent years. From this viewpoint, thermoplastic polyolefin resins, for example, polypropylene resin (hereinafter abbreviated as "PP resin"), ABS resin, AS resin, polyolefin-based thermoplastic elastomers (hereinafter abbreviated as "TPO resins") and the like are used as materials for forming the above-described members. However, these thermoplastic polyolefin resins are inferior in surface adhesiveness, scratch resistance, abrasion resistance and chemical resistance in comparison with vinyl chloride resin and the like which have been conventionally used, and therefore, are required to apply coatings for providing improved performance. To realize artistry for giving a high-grade appearance, or concerning car interior trim materials in particular, it is necessary to consider not only the artistry but also an attention to anti-glare properties for drivers. Accordingly, it is also practiced to apply various coatings to the surfaces of thermoplastic polyolefin base materials such that top coat layers are formed to impart functionality and the thermoplastic polyolefin base materials are converted to still better skin materials made of the thermoplastic polyolefin resins.

Conventionally proposed is a method that uses a chlorinated polypropylene resin, which has good adhesiveness to a polyolefin-based resin such as PP resin or a TPO resin used as a base material, in a coating formulation to be employed in the above-described coating applications. Specifically, there have been proposed, for example, a method that uses a coating formulation containing a chlorinated polypropylene-modified acrylic resin as a binder resin and a matting agent such as an inorganic extender pigment (silica or talc) or acrylic resin particles added thereto, and a method that applies a chlorinated polypropylene-based primer and applies on the primer a coating formulation containing a polyester resin or polyurethane resin.

Recently, there is an increasing consciousness towards environmental problems. More and more makers are, therefore, positively working on environmental measures, resulting in a move toward forming such products by using materials excellent not only in functionality but also in environmental conservation properties. Active research is hence under way, for example, to avoid choosing specific solvents (toluene and the like) from organic solvents for use in the above-described coating formulations or to use water-based resins instead of organic solvents for reducing VOC (volatile organic compound) emissions as much as possible. However, these approaches are still insufficient for the realization of the conservation of the current environment on the global scale (see Patent Documents 6 to 8). As the reduction of carbon dioxide emissions has become a critical worldwide issue as mentioned above, the development and use, if possible, of a material making use of carbon dioxide as a raw material will be extremely effective.

PRIOR ART DOCUMENTS

Patent Documents

Patent Document 1: U.S. Pat. No. 3,072,613
Patent Document 2: JP-A-2000-319504
Patent Document 3: JP-A-2009-144313
Patent Document 4: JP-A-2007-270373
Patent Document 5: JP-A-2005-154580
Patent Document 6: JP-A-2006-307015
Patent Document 7: JP-A-2004-51901
Patent Document 8: JP-A-2006-176615

Non-Patent Documents

Non-patent Document 1: N. Kihara, T. Endo, J. Org. Chem., 58, 6198 (1993)
Non-patent Document 2: N. Kihara, T. Endo, J. Polymer Sci., Part A Polymer Chem., 31(11), 2765 (1993)

DISCLOSURE OF THE INVENTION

Problem to be Solved by the Invention

However, polyhydroxy polyurethane resins are evidently inferior in characteristics to polyurethane-based resins comparable as high-molecular compounds of similar type as mentioned above, and as an actual situation, the development of their applications has not moved ahead. To enable using, for industrial applications, these polyhydroxy polyurethane resins produced by using carbon dioxide as a raw material, they, however, need to be improved in performance and to be provided with a new additional value. Described specifically, there is an outstanding desire for the development of a resin improved in performance indispensable as an industrial material, such as still higher heat resistance, chemical resistance and abrasion resistance, in addition to the viewpoint of the protection of the global environment.

Therefore, a first object of the present invention is to provide a technology that makes it possible to effectively use, for industrial applications, polyhydroxy polyurethane resins, the development of applications of which has not moved ahead although they are useful materials considered to contribute to the resolution of problems such as global warming and resource depletion. More specifically, it is an object to provide a self-crosslinking polysiloxane-modified polyhydroxy polyurethane resin, which is also sufficiently satisfactory in performances such as heat resistance, chemical resistance and abrasion resistance although products formed with the resin are responsive to the environment.

A second object of the present invention is to provide an imitation leather, which can contribute to the reduction of carbon dioxide considered worldwide to pose a problem as a global greenhouse gas and is also useful as an excellent environment-responsive product from the viewpoint of the conservation of the global environment, by producing the imitation leather especially with the material which is not inferior to conventional imitation leathers, is excellent in touch feeling and also in surface scratch resistance, abrasion resistance, chemical resistance and heat resistance, and contains carbon dioxide incorporated and fixed therein.

A third object of the present invention is to provide a skin material made of a thermoplastic polyolefin resin, which is excellent in effects such as scratch resistance, abrasion resistance, chemical resistance and heat resistance, is also excellent in uniform matte effect as needed, and in addition to these effects, is also useful as an environment-responsive product that from the viewpoint of the conservation of the global environment, can incorporate carbon dioxide in a constituent raw material for the product and can contribute to the reduction of carbon dioxide as a warming gas. It is to be noted that the term "a skin material made of a thermoplastic polyolefin resin" means one obtained by forming a top coat layer directly or via a primer layer on a surface of a sheet-shaped base material made of the thermoplastic polyolefin resin to impart functionality to the surface.

Means for Solving the Problem

The above-described objects can be achieved by the present invention to be described hereinafter. Specifically, the present invention provides, in the first aspect thereof, a self-crosslinking polysiloxane-modified polyhydroxy polyurethane resin characterized by having been derived from a reaction of a 5-membered cyclic carbonate polysiloxane compound represented by the following formula (1) and an amine compound and having polysiloxane segments and masked isocyanate groups in a structure thereof:

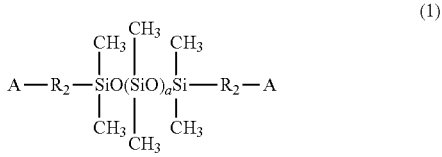

(1)

wherein A means

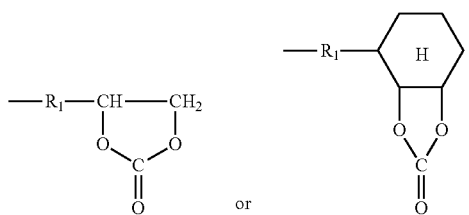

in which $R_1$ means an alkylene group which has from 1 to 12 carbon atoms and may be connected therein via an element of O, S or N and/or $-(C_2H_4O)_b-$, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

As more preferred embodiments of the resin, the following resins can be mentioned: the 5-membered cyclic carbonate polysiloxane compound is a reaction product of an epoxy-modified polysiloxane compound and carbon dioxide, and contains, in a structure thereof, carbon dioxide in a range of from 1 to 25 mass %; a content of the polysiloxane segments in the resin is from 1 to 75 mass % in terms of a siloxane content in resin molecules; and the masked isocyanate groups are reaction products of organic polyisocyanate groups and a masking agent, and, when subjected to heat treatment, are demasked to form isocyanate groups, which are reactable with hydroxyl groups in the structure of the self-crosslinking polysiloxane-modified polyhydroxy polyurethane resin such that the resin is allowed to undergo self-crosslinking.

The present invention also provides, in another embodiment, a process for producing the above-described self-crosslinking polysiloxane-modified polyhydroxy polyurethane resin, characterized by using a modifier having at least one free isocyanate group and at least one masked isocyanate group, and reacting free isocyanate groups of the modifier with hydroxyl groups in a polysiloxane-modified polyhydroxy polyurethane resin, which has been derived from the reaction of the 5-membered cyclic carbonate polysiloxane compound and the amine compound, to obtain the polysiloxane-modified polyhydroxy polyurethane resin having the masked isocyanate groups in the structure thereof.

As more preferred embodiments of the production process, the following processes can be mentioned: as the 5-membered cyclic carbonate polysiloxane compound, a reaction product of an epoxy-modified polysiloxane compound and carbon dioxide is used, and the polysiloxane-modified polyhydroxy polyurethane resin is derived from a reaction of the compound and the amine compound such that carbon dioxide is contained in a range of from 1 to 25 mass % in the polysiloxane-modified polyhydroxy polyurethane resin; and the modifier is a reaction product of an organic polyisocyanate compound and a masking agent.

The present invention also provides, as a further embodiment thereof, a resin material characterized by comprising the above-described self-crosslinking polysiloxane-modified polyhydroxy polyurethane resin and another binder resin blended therewith.

The present invention also provides, in a second aspect thereof, an imitation leather characterized by comprising a base fabric and a resin composition composed, as a principal component, of the self-crosslinking polysiloxane-modified polyurethane resin according to the first aspect of the present invention, which has been derived from a reaction of a 5-membered cyclic carbonate polysiloxane compound represented by the above-described formula (1) and an amine compound and has masked isocyanate groups in a structure thereof and has been impregnated in or laminated on the base fabric.

As more preferred embodiments of the imitation leather, the following imitation leathers can be mentioned: the above-described imitation leather wherein the 5-membered cyclic carbonate polysiloxane compound is a reaction product of an epoxy-modified polysiloxane compound and carbon dioxide, and carbon dioxide is contained in a range of from 1 to 25 mass % in the structure of the self-crosslinking polysiloxane-modified polyhydroxy polyurethane resin; the above-described imitation leather wherein the masked isocyanate groups are reaction products of organic polyisocyanate groups and a masking agent, and, when subjected to heat treatment, are demasked to form isocyanate groups, which are reactable with hydroxyl groups in the structure of the self-crosslinking polysiloxane-modified polyhydroxy polyurethane resin such that the resin is allowed to undergo self-crosslinking; and the above-described imitation leather wherein the resin composition further comprises another resin different from the self-crosslinking polysiloxane-modified polyhydroxy polyurethane resin.

The present invention also provides, in a third aspect thereof, a skin material made of a thermoplastic polyolefin resin, characterized by comprising a thermoplastic polyolefin resin sheet and one of a top coat layer formed directly on the sheet and a top coat layer formed via a primer layer on the sheet, wherein the top coat layers have each been formed with a resin composition composed, as a principal component, of the self-crosslinking polysiloxane-modified polyhydroxy polyurethane resin according to the first aspect of the present invention which has been derived from a reaction of a 5-membered cyclic carbonate polysiloxane compound represented by the above-described formula (1) and has masked isocyanate groups in a structure thereof.

As preferred embodiments of the skin material, the following skin materials can be mentioned:

the skin material wherein the 5-membered cyclic carbonate polysiloxane compound has been obtained by reacting an epoxy-modified polysiloxane compound and carbon dioxide, the carbon dioxide derived from the raw material is contained in a range of from 1 to 25 mass % in a structure of the above-described self-crosslinking polysiloxane-modified polyhydroxy polyurethane resin, and a content of polysiloxane segments in molecules of the above-described self-crosslinking polysiloxane-modified polyhydroxy polyurethane resin is from 1 to 75 mass %;

the skin material wherein the masked isocyanate groups are reaction products of organic polyisocyanate groups and a masking agent, and, when subjected to heat treatment, are demasked to form isocyanate groups, which are reactable with hydroxyl groups in the structure of the self-crosslinking polysiloxane-modified polyhydroxy polyurethane resin such that the resin is allowed to undergo self-crosslinking;

the skin material wherein the self-crosslinking polysiloxane-modified polyhydroxy polyurethane resin has been obtained by modifying, with a modifier, a polysiloxane-modified polyhydroxy polyurethane resin derived from a reaction of a 5-membered cyclic carbonate polysiloxane compound and an amine compound;

the skin material wherein the top coat layers have each been formed with a composition comprising the self-crosslinking polysiloxane-modified polyhydroxy polyurethane resin and a material, which is composed of one fine powder or a combination of two or more fine powders selected from organic fine powders and inorganic fine powders, added as a matting agent in a proportion of from 1 to 150 parts by mass per 100 parts by mass of the self-crosslinking polysiloxane-modified polyhydroxy polyurethane resin; and the skin material wherein the top coat layers have each been formed with a composition which comprises, in addition to the above-described self-crosslinking polysiloxane-modified polyhydroxy polyurethane resin, another resin different from the self-crosslinking polysiloxane-modified polyhydroxy polyurethane resin.

Advantageous Effects of the Invention

According to the first aspect of the present invention, it is possible to provide a self-crosslinking polysiloxane-modified polyhydroxy polyurethane resin capable of serving as a material that can make a polyhydroxy polyurethane resin, the development of applications of which has not moved ahead although it is considered to contribute to the resolution of problems such as global warming and resource depletion, effectively usable for industrial applications. More specifically, the present invention provides a self-crosslinking polysiloxane-modified polyhydroxy polyurethane resin that products molded or otherwise formed with the resin can be also sufficiently satisfactory in performance such as heat resistance, chemical resistance and abrasion resistance although they are environment-responsive products which contain carbon dioxide incorporated therein and can contribute to the reduction of warming gas.

According to the second aspect of the present invention, there is also provided an imitation leather useful as an environment-responsive product, which is not inferior to conventional imitation leathers, is excellent in hand feeling and also in surface scratch resistance, abrasion resistance, chemical resistance and heat resistance and which can also contribute to the reduction of carbon dioxide considered to be a worldwide problem as a global greenhouse gas and is also excellent from the viewpoint of the conservation of the global environment, owing to the production of the imitation leather by using, as a material for forming the imitation leather, a material with carbon dioxide incorporated and fixed therein.

According to the third aspect of the present invention, there is also provided a skin material made of a thermoplastic polyolefin material, which, owing to the use of a self-crosslinking polysiloxane-modified polyhydroxy polyurethane resin with at least masked isocyanate groups contained in their molecules, in a top coat layer that makes up the skin material, is excellent in surface scratch resistance, abrasion resistance, chemical resistance and heat resistance, and can be made excellent in uniform matte effect if needed, and which owing to the usability of the material with carbon dioxide incorporated therein in addition to the-above described excellent performance, is an environment-responsive product that can also contribute to the reduction of carbon dioxide considered to be a worldwide problem as a warming gas.

MODES FOR CARRYING OUT THE INVENTION

The present invention will next be described in further detail based on preferred embodiments. The self-crosslinking polysiloxane-modified polyhydroxy polyurethane resin that characterizes the present invention has been derived from a reaction of a 5-membered cyclic carbonate polysiloxane compound represented by the following formula (1) and an amine compound and having polysiloxane segments and masked isocyanate groups in a structure thereof:

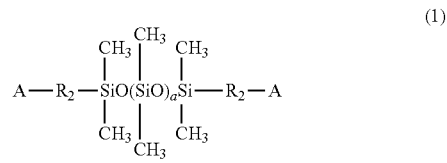

wherein A means

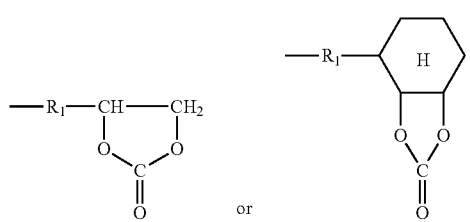

in which $R_1$ means an alkylene group which has from 1 to 12 carbon atoms and may be connected therein via an element of O, S or N and/or —$(C_2H_4O)_b$—, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

The self-crosslinking polysiloxane-modified polyhydroxy polyurethane resin that characterizes the present invention can be obtained by using a modifier having at least one free isocyanate group and at least one masked isocyanate group, and reacting free isocyanate groups of the modifier with hydroxyl groups in the polysiloxane-modified polyhydroxy polyurethane resin derived from the reaction of the 5-membered cyclic carbonate polysiloxane compound and the amine compound. As the 5-membered cyclic carbonate polysiloxane compound can be obtained by reacting an epoxy-modified polysiloxane compound and carbon dioxide, the above-described self-crosslinking polysiloxane-modified polyhydroxy polyurethane resin can serve as a material that also contributes to environmental conservation properties. A description will hereinafter be made about the respective components.

[Self-Crosslinking Polysiloxane-Modified Polyhydroxy Polyurethane Resin]
(Modifier)
<Organic Polyisocyanate Compound>

A description will be made about the components for the modifier that is used in the production process of the self-crosslinking polysiloxane-modified polyhydroxy polyurethane resin according to the present invention. As the modifier, a reaction product of an organic polyisocyanate compound and a masking agent can be used. As the organic polyisocyanate compound usable in the present invention, it is possible to mention an organic compound which is an aliphatic or aromatic compound and has at least two isocyanate groups therein. Such organic compounds have been widely used as synthesis raw materials for polyurethane resins over years. These known organic polyisocyanate compounds are all useful in the present invention. As particularly preferred organic polyisocyanate compounds usable in the present invention, the followings can be mentioned.

For example, 1,4-tetramethylene diisocyanate, 1,5-pentamethylene diisocyanate, 1,6-hexamethylene diisocyanate, 3-isocyanatomethyl-3,5,5-trimethylcyclohexyl isocyanate (isophorone diisocyanate), 4,4'-dicyclohexylmethane diisocyanate, tolylene diisocyanate, 4,4'-diphenylmethane diisocyanate, 1,5-nephthalene diisocyanate, tolidine diisocyanate, xylylene diisocyanate, and the like can be exemplified. Adducts of these organic polyisocyanate compounds and other compounds, for example, those of the following structural formulas can also be used suitably. The present invention shall, however, not be limited to their use.

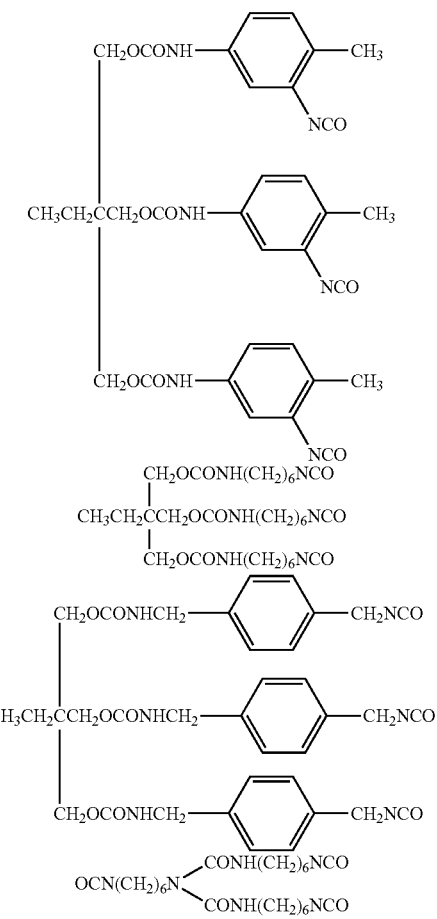

<Masking Agent>

The masking agent for use in the present invention is one having at least one free isocyanate group and at least one masked isocyanate group, and can be obtained as a reaction product of such an organic polyisocyanate as described above and such a masking agent as will be mentioned below. As the masking agent, those to be described below can be used. They are alcohol-based, phenol-based, active methylene-based, acid amide-based, imidazole-based, urea-based, oxime-based and pyridine-based compounds, and the like. They can be used either singly or in combination. Specific masking agents include those to be described below.

As alcohol-based masking agents, methanol, ethanol, propanol, butanol, 2-ethylhexanol, methylcellosolve, cyclohexanol and the like can be mentioned. As phenol-based masking agents, phenol, cresol, ethylphenol, nonylphenyl and the like can be mentioned. As active methylene-based masking agents, dimethyl malonate, diethyl malonate, methyl acetoacetate, ethyl acetoacetate, acetylacetone and the like can be mentioned. As acid amide-based masking agents, acetoanilide, acetic acid amide, ε-caprolactam, γ-butyrolactam and the like can be mentioned. As imidazole-based masking agents, imidazole, 2-methylimidazole and the like can be mentioned. As urea-based masking agents, urea, thiourea, ethylene urea and the like can be mentioned. As oxime-based masking agents, formamidoxime, acetoxime, methyl ethyl ketoxime, cyclohexanone oxime and the like can be mentioned. As pyridine-based masking agents, 2-hydroxypyridine, 2-hydroxyquinoline and the like can be mentioned.

<Synthesis Process of Modifier>

By reacting one of the above-enumerated organic polyisocyanate compounds and one of the above-enumerated masking agents, a modifier which is useful in the present invention is synthesized with at least one free isocyanate group and at least one masked isocyanate group contained therein. No particular limitation is imposed on the synthesis process to be used in the above-described synthesis, but a modifier can be obtained, for example, by reacting such a masking agent as described above and such an organic polyisocyanate compound as described above at such a functional group ratio that one or more isocyanate groups become excessive per molecule, in the presence or absence of an organic solvent and catalyst, at a temperature of from 0 to 150° C., preferably from 20 to 80° C., for from 30 minutes to 3 hours.

(Polysiloxane-Modified Polyhydroxy Polyurethane Resin)

The polysiloxane-modified polyhydroxy polyurethane resin according to the present invention, which has been modified with a specific modifier obtained by such a process as described above, can be obtained by a reaction of a specific 5-membered cyclic carbonate polysiloxane compound and an amine compound. A description will hereinafter be made about the respective components to be used in the reaction.

<5-Membered Cyclic Carbonate Polysiloxane Compound>

The 5-membered cyclic carbonate polysiloxane compound, which is represented by the formula (1) and is useful in the present invention, can be produced by reacting an epoxy-modified polysiloxane compound and carbon dioxide as shown by the below-described "Equation-A". Described more specifically, it can be obtained by reacting the epoxy-modified polysiloxane compound with carbon dioxide in the presence or absence of an organic solvent, in the presence of a catalyst, at a temperature of from 40° C. to 150° C., under normal pressure or slightly elevated pressure, for from 10 to 20 hours.

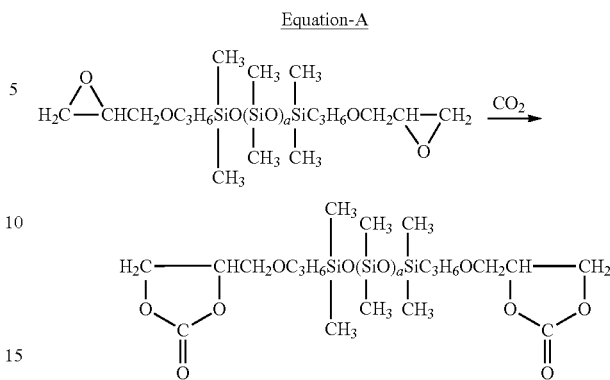

Examples of the epoxy-modified polysiloxane compound, which is suitably usable upon conducting the above-described synthesis, include such compounds as will be described next.

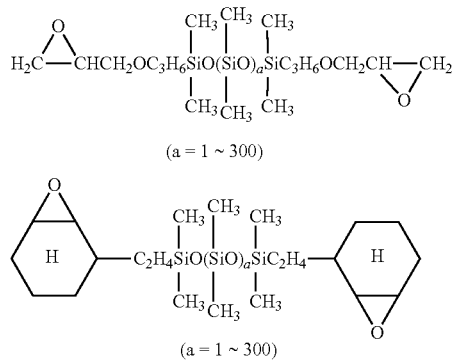

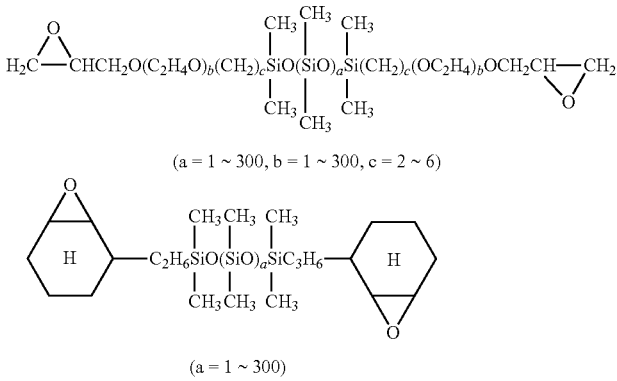

The above-enumerated epoxy-modified polysiloxane compounds are preferred compounds which can be used in the present invention, and the present invention shall not be limited to the use of these exemplified compounds. Not only the above-exemplified compounds but also other similar epoxy-modified polysiloxane compounds are available on the market these days. Accordingly, those readily available on the market can all be used in the present invention.

<Catalyst and Reaction>

As catalysts usable in the reaction of the epoxy-modified polysiloxane compound and carbon dioxide as described above, base catalysts and Lewis acid catalysts can be mentioned.

The base catalysts include tertiary amines such as triethylamine and tributylamine; cyclic amines such as diazabicycloundecene, diazabicyclooctane and pyridine; alkali metal salts such as lithium chloride, lithium bromide, lithium fluoride and sodium chloride; alkaline earth metal salts such as calcium chloride; quaternary ammonium salts such as tetrabutyl ammonium chloride, tetraethyl ammonium bromide and benzyl trimethyl ammonium chloride; carbonate salts such as potassium carbonate and sodium carbonate; metal acetate salts such as zinc acetate, lead acetate, copper acetate and iron acetate; metal oxides such as calcium oxide, magnesium oxide and zinc oxide; and phosphonium salts such as tetrabutyl phosphonium chloride.

The Lewis acid catalysts include tin compounds such as tetrabutyltin, dibutyltin dilaurate, dibutyltin diacetate and dibutyltin octoate.

The above-described catalyst may be used preferably in a proportion of from 0.1 to 100 parts by mass per 50 parts by mass of the epoxy-modified polysiloxane compound, with from 0.3 to 20 parts by mass being more preferred. If the above-described catalyst is used in a proportion of smaller than 0.1 parts by mass, the catalyst will be unable to exhibit much effects by its addition as a catalyst. If the above-described catalyst is used in a proportion of greater than 100 parts by mass, on the other hand, the resin to be obtained finally may be lowered in various performance. Therefore, such an excessively small or large proportion is not preferred. In such a case that the residual catalyst would induce a serious reduction in performance, however, it may be configured to wash the reaction mixture with purified water after completion of the reaction such that the residual catalyst can be removed.

Organic solvents usable in the reaction of the epoxy-modified polysiloxane compound and carbon dioxide include, for example, dimethylformamide, dimethyl sulfoxide, dimethylacetamide, N-methylpyrrolidone, N-ethylpyrrolidone, tetrahydrofuran, and the like. These organic solvents may also be used as mixed systems with other poor solvents, for example, methyl ethyl ketone, xylene, toluene, tetrahydrofuran, diethylether, cyclohexanone, and the like.

The polysiloxane-modified polyhydroxy polyurethane resin for use in the present invention can be obtained by reacting such a 5-membered cyclic carbonate polysiloxane compound as described above with an amine compound in the presence of an organic solvent at a temperature of from 20° C. to 150° C. as shown by the below-described "Equation-B".

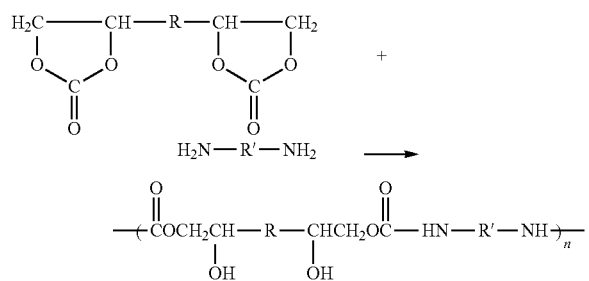

wherein R means

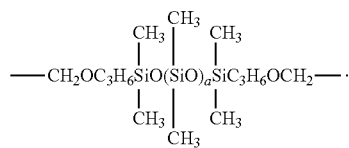

<Amine Compound>

As the amine compound usable in the above-described reaction, a diamine is preferred. No particular limitation is imposed on the diamine, and those which have been conventionally used in the production of polyurethane resins are all usable. Illustrative are aliphatic diamines such as methylenediamine, ethylenediamine, trimethylenediamine, 1,3-diaminopropane, hexamethylenediamine and octamethylenediamine; aromatic diamines such as phenylenediamine, 3,3'-dichloro-4,4'-diaminodiphenylmethane, 4,4'-methylenebis(phenylamine), 4,4'-diaminodiphenyl ether, 4,4'-diaminodiphenylsulfone, meta-xylylenediamine and para-xylylenediamine; alicyclic diamines such as 1,4-cyclohexanediamine, 4,4'-diaminocyclohexylmethane, 1,4'-diaminomethylcyclohexane and isophorone diamine; and alkanoldiamines such as monoethanoldiamine, ethylaminoethanolamine and hydroxyethylaminopropylamine.

The above-enumerated amine compounds are those preferred for use in the present invention, and the present invention shall not be limited to the use of these exemplified compounds. Amine compounds usable in the present invention are, therefore, not limited to the above-exemplified compounds alone. Other amine compounds are also available on the market these days. These amine compounds readily available from the market can all be used in the present invention.

Concerning the polysiloxane-modified polyhydroxy polyurethane resin obtained as described above, the proportion of polysiloxane segments in the resin may preferably be from 1 to 75 mass % in terms of a content of the segments in resin molecules. A proportion smaller than 1 mass % leads to insufficient development of a function associated with surface energy based on the polysiloxane segments, while a proportion greater than 75 mass % results in a polyhydroxy urethane resin insufficient in performance such as mechanical strength and abrasion resistance. Proportions outside the above-described range are not preferred accordingly. The proportion may be more preferably from 2 to 70 mass %, still more preferably from 5 to 60 mass %.

<Physical Properties>

Further, the polysiloxane-modified polyhydroxy polyurethane resin for use in the present invention may preferably have a number average molecular weight (a polystyrene-equivalent value as measured by GPC) of from 2,000 to 100,000 or so, with from 5,000 to 70,000 or so being more preferred.

The hydroxyl number of the polysiloxane-modified polyhydroxy polyurethane resin for use in the present invention may preferably be from 20 to 300 mgKOH/g. If the hydroxyl number is smaller than the above-described range, the carbon dioxide reduction effect can be hardly obtained to sufficient extent. If the hydroxyl number exceeds the above-described range, various physical properties as a high molecular compound may not be obtained sufficiently. Hydroxyl numbers outside the above-described range are not preferred accordingly.

(Self-Crosslinking Polysiloxane-Modified Polyhydroxy Polyurethane Resin)

The self-crosslinking polysiloxane-modified polyhydroxy polyurethane resin provided according to the first aspect of the present invention can be obtained by reacting a modifier and a polysiloxane-modified polyhydroxy polyurethane resin, both of which have been obtained as mentioned above. Specifically, it can be obtained through a reaction between hydroxyl groups in the polysiloxane-modified polyhydroxy polyurethane resin and at least one free isocyanate group in the modifier.

The modification rate of the self-crosslinking polysiloxane-modified polyhydroxy polyurethane resin according to the present invention with the modifier may preferably be from 2 to 60%. A modification rate of lower than 2% is not preferred, because it induces no sufficient crosslinking so that the resulting product may be insufficient in heat resistance, chemical resistance and the like. A modification rate of higher than 60%, on the other hand, is not preferred either, because the possibility that demasked isocyanate groups would remain without any reaction may increase. It is to be noted that the modification rate is calculated as follows.

Modification rate (%)={1−(hydroxyl groups in a resin after modification÷hydroxyl groups in the resin before modification)}×100

The reaction of the modifier and polysiloxane-modified polyhydroxy polyurethane resin can be conducted in the presence or absence of an organic solvent and catalyst, at a temperature of from 0 to 150° C., preferably from 20 to 80° C. for from 30 minutes to 3 hours, and the self-crosslinking polysiloxane-modified polyhydroxy polyurethane resin according to the present invention can be readily obtained by the reaction. However, it is necessary to pay attention to carrying out the reaction at a temperature of lower than the removal temperature of the masking agent during the reaction such that the synthesized polysiloxane-modified polyhydroxy polyurethane resin has masked isocyanate groups in its structure.

[Use of Self-Crosslinking Polysiloxane-Modified Polyhydroxy Polyurethane Resin]

The self-crosslinking polysiloxane-modified polyhydroxy polyurethane resin of the present invention, which can be obtained as described above, can be used, as it is, as film and molding materials, various coating materials, diverse paints, miscellaneous binders and the like, so that products excellent in performance such as lubricity, abrasion resistance, chemical resistance, non-tackiness and heat resistance can be obtained. For various applications and upon formation of films, the self-crosslinking polysiloxane-modified polyhydroxy polyurethane resin according to the present invention can be used by blending desired one or ones of conventionally-known diverse resins as binder resin or resins or the like in the self-crosslinking polysiloxane-modified polyhydroxy polyurethane resin for the purpose of adjusting the characteristics of the resin or for a like purpose. Preferred as binder resins usable as described above are those which can chemically react with isocyanate groups formed as a result of the removal of masked moieties in the structure of the self-crosslinking polysiloxane-modified polyhydroxy polyurethane resin. Usable binder resins are, however, not limited to the above-described ones, and even resins which do not have such reactivity as described above can still be used as needed according to purposes in combination with the self-crosslinking polysiloxane-modified polyhydroxy polyurethane resin according to the present invention.

As binder resins usable in combination with the self-crosslinking polysiloxane-modified polyhydroxy polyurethane resin according to the present invention, various resins which have been conventionally employed as binder resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. It is also possible to use resins obtained by modifying these various resins with silicone or fluorine. When such a binder resin is used in combination, it may be added in a proportion of preferably from 5 to 90 parts by mass, more preferably not greater than 60 parts by mass per 100 parts by mass of the self-crosslinking polysiloxane-modified polyhydroxy polyurethane resin according to the present invention although the proportion differs depending on the product to be formed or its application purpose. Needless to say, as the self-crosslinking polysiloxane-modified polyhydroxy polyurethane resin according to the present invention is used in a greater proportion, the resulting environment-responsive product becomes more preferred.

When subjected to heat treatment, the self-crosslinking polysiloxane-modified polyhydroxy polyurethane resin according to the present invention is demasked to form isocyanate groups. The thus-formed isocyanate groups react with hydroxyl groups in the polysiloxane-modified polyhydroxy polyurethane resin, thereby undergoing self-crosslinking to form a crosslinked resin. The use of the resin according to the present invention can, therefore, provide products excellent in heat resistance, abrasion resistance, chemical resistance and the like. Presumably, the excellent performance of polysiloxane segments, such as heat resistance, lubricity and non-tackiness, can be exhibited because these polysiloxane segments orient in the surface of the polyurethane resin. On the other hand, the self-crosslinking polysiloxane-modified polyhydroxy polyurethane resin according to the present invention is synthesized using a 5-membered cyclic carbonate polysiloxane compound. As this 5-membered cyclic carbonate polysiloxane compound can be obtained by reacting an epoxy-modified polysiloxane compound and carbon dioxide as described above, carbon dioxide can be incorporated and fixed in the resin. This means that the present invention makes it possible to provide a material and product responsive to environmental conservation, which are useful from the viewpoint of the reduction of warming gas and has not been realized with conventional products.

The self-crosslinking polysiloxane-modified polyhydroxy polyurethane resin according to the present invention is very useful as various molding materials, materials for synthetic leathers and artificial leathers, fiber coating materials, surface treatment materials, thermal recording media, strippable materials, paints, binders for printing inks, and the like as described above. A description will hereinafter be made about each of its application examples, that is, an imitation leather (synthetic leather or artificial leather material) and a skin material made of a thermoplastic olefin resin.

<Imitation Leather>

(Resin Composition for Imitation Leather)

The imitation leather according to the present invention is characterized in that a resin composition (hereinafter called "the resin composition for imitation leather"), which contains as a principal component the self-crosslinking polysiloxane-modified polyhydroxy polyurethane resin derived from the above-mentioned reaction of the 5-membered cyclic carbonate polysiloxane compound represented by the following formula (1) and the amine compound and having masked isocyanate groups in its structure, is filled in or laminated on a base fabric.

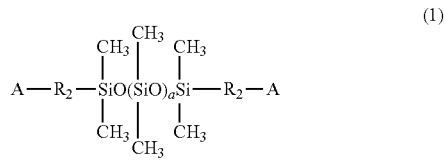

wherein A means

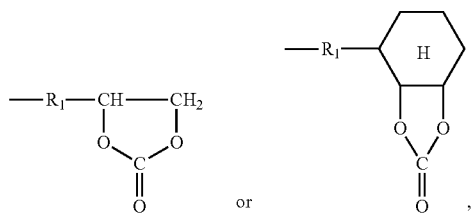

in which $R_1$ means an alkylene group which has from 1 to 12 carbon atoms and may be connected therein via an element of O, S or N and/or —$(C_2H_4O)_b$—, $R_2$ means a direct bond or an alkylene group having from 2 to 20 carbon atoms, $R_2$ may be linked to an alicyclic group or aromatic group, b stands for a number of from 1 to 300, and a stands for a number of from 1 to 300.

The masked isocyanate groups in the resin are reaction products of organic polyisocyanate groups and a masking agent and, when subjected to heat treatment, are demasked to form isocyanate groups, which are reactable with hydroxyl groups in the structure of the self-crosslinking polysiloxane-modified polyhydroxy polyurethane resin such that the resin is allowed to undergo self-crosslinking. Therefore, the use of the resin makes it possible to obtain an imitation leather excellent in hand feeling and also in surface scratch resistance, abrasion resistance, chemical resistance and heat resistance.

Concerning the self-crosslinking polysiloxane-modified polyhydroxy polyurethane resin which is useful in the present invention and is preferred particularly from the viewpoint of the conservation of the global environment, the 5-membered cyclic carbonate polysiloxane compound is the reaction product of the epoxy-modified polysiloxane compound and carbon dioxide, and contains carbon dioxide in a range of from 1 to 25 mass % in its structure. The resin composition for imitation leather may further contain one or more resins other than the above-described resin.

When using the self-crosslinking polysiloxane-modified polyhydroxy polyurethane resin according to the present invention for an imitation leather, the modification rate of the resin with a modifier may preferably range from 2 to 60%. Its performance such as the abrasion resistance, chemical resistance and heat resistance after heat treatment can be controlled to some extent by the percentage of the modification rate. However, a modification rate of lower than 2% is not preferred, because no sufficient crosslinking occurs and, when employed for the production of an imitation leather, the imitation leather may be insufficient in heat resistance, chemical resistance and the like. A modification rate of higher than 60%, on the other hand, is not preferred either, because the possibility that demasked isocyanate groups would remain without any reaction may increase.

The resin composition for imitation leather may be used preferably in the form of an organic solvent solution or a water dispersion upon production of an imitation leather. When the resin composition is used in the form of an organic solvent solution, it is preferred to use an organic solvent to be described below. Examples include dimethylformamide, dimethylsulfoxide, dimethyl acetamide, N-methylpyrrolidone, N-ethylpyrrolidone, and the like. The concentration of the resin in the organic solvent solution 100 mass % may preferably be from 10 to 60 mass %. A resin concentration of lower than 10 mass % is not preferred, because it may lead to inferior film-forming properties in wet-process film formation, the resulting film may be insufficient in thickness, and hence, the resulting imitation leather may be provided with insufficient strength. A resin concentration of higher than 60 mass %, on the other hand, is not preferred either, because it may lead to incomplete formation of a porous layer in wet-process film formation, and moreover, may raise such a problem that the organic solvent would remain in the resulting film. Excessive use of an organic solvent is not preferred either from the viewpoint of measures against VOC.

When the resin composition for imitation leather is used in the form of a water dispersion, it is preferred to use the resin composition for imitation leather as will be described hereinafter. First, the hydroxyl groups or NH groups in the self-crosslinking polysiloxane-modified polyhydroxy polyurethane resin are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion. As the acid anhydride used here, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the resin composition composed, as a principal component, of the self-crosslinking polysiloxane-modified polyhydroxy polyurethane resin may be a water dispersion emulsified with a surfactant in water by a method known per se in the art.

The resin composition for imitation leather may also be used by blending one or more of conventionally-known various other resins to adjust the workability such as impregnation, coating or covering applicability and the hand feeling and various performance of the imitation leather to be obtained. Preferred as other resins to be used or blended are those chemically reactable with isocyanate groups to be formed as a result of removal of the masking agent in the self-crosslinking polysiloxane-modified polyhydroxy polyurethane resin. However, even those having no reactivity can be also used in the present invention.

As resins usable when the resin composition for imitation leather, which is useful in the present invention, is in the form that the self-crosslinking polysiloxane-modified polyhydroxy polyurethane resin is used in combination with one or more resins other than the afore-mentioned resin, polyurethane-based resins which have been conventionally used in the production of imitation leathers are preferred although no particular limitation is imposed. Usable examples include acrylic resins, polyester resins, polybutadiene resins, silicone resins, melamine resins, phenol resins, phenoxy resins, vinyl chloride resin, vinyl chloride-vinyl acetate resin, cellulose resins, alkyd resins, modified cellulose resins, fluorinated resins, polyvinyl butyral resins, epoxy resins, polyamide resins, and the like. When one or more of these resins are used in combination, such a resin or resins may be used in a range of from 5 to 90 mass % based on the self-crosslinking polysiloxane-modified polyhydroxy polyurethane resin composition according to the present invention. As the self-crosslinking polyhydroxy polyurethane resin according to the present invention is used in a greater proportion, the resulting imitation leather becomes a more preferred environment-responsive product.

To the resin composition which is for use in the present invention and is composed, as a principal component, of the self-crosslinking polysiloxane-modified polyhydroxy polyurethane resin, one or more of various additives such as antioxidants, ultraviolet absorbers, anti-hydrolysis agents, pigments, dyes, flame retardants and fillers may be added in addition to one or more of the above-described various resins.

(Production Process of Imitation Leather)

The imitation leather according to the present invention is characterized in that the resin composition, which is composed, as a principal component, of the above-described self-crosslinking polysiloxane-modified polyhydroxy polyurethane resin according to the present invention, is filled in or laminated on the base fabric. No particular limitation is imposed on the production process of the imitation leather, and a known production process of an artificial leather or synthetic leather can be used. In the imitation leather according to the present invention, there is also included one produced by arranging a plasticizer-containing, vinyl chloride resin layer on a base fabric, providing it as a base material sheet, and forming on the base material sheet a layer formed of a resin composition composed, as a principal component, the self-crosslinking polysiloxane-modified polyhydroxy polyurethane resin which characterizes the present invention.

As the base fabric (base material sheet) that makes up the imitation leather according to the present invention, base fabrics (base material sheets) which have been conventionally used in the production of imitation leathers are all usable, and no particular limitation is imposed.

The imitation leather according to the present invention is provided with hand feeling and surface scratch resistance, abrasion resistance, chemical resistance and heat resistance. Further, the self-crosslinking polysiloxane-modified polyhydroxy polyurethane resin useful in the imitation leather according to the present invention is synthesized by using the 5-membered cyclic carbonate polysiloxane compound. As mentioned above, the 5-membered cyclic carbonate polysiloxane compound can be obtained by reacting the epoxy compound and carbon dioxide so that carbon dioxide can be incorporated and fixed in the resin. This means that the present invention makes it possible to provide an imitation leather as a product responsive to environmental conservation, which is useful from the viewpoint of the reduction of warming gas and has not been realized with conventional products.

[Skin Material Made of Thermoplastic Polyolefin Resin]
(Resin Composition for Skin Material)

The skin material according to the present invention, which is made of the thermoplastic polyolefin resin, is characterized in that the skin material has the thermoplastic polyolefin resin sheet and a top coat layer formed directly on the sheet or a top coat layer formed via a primer layer on the sheet and the top coat layers have each been formed with a resin composition composed as a principal component of the above-mentioned self-crosslinking polysiloxane-modified polyhydroxy polyurethane resin according to the present invention. The masked isocyanate groups in the resin are reaction products of organic polyisocyanate groups and a masking agent and, when subjected to heat treatment, are demasked to form isocyanate groups, which are reactable with hydroxyl groups in the structure of the self-crosslinking polysiloxane-modified polyhydroxy polyurethane resin such that the resin is allowed to undergo self-crosslinking. Therefore, the use of the resin makes it possible to obtain a skin material, which is made of the thermoplastic polyolefin resin, is not inferior in hand feeling to that made of vinyl chloride resin widely used for skin materials, and is excellent in surface scratch resistance, abrasion resistance, chemical resistance and heat resistance.

When using the self-crosslinking polysiloxane-modified polyhydroxy polyurethane resin according to the present invention for a skin material, the modification rate of the resin with a modifier may preferably range from 2 to 60%. A modification rate of lower than 2% in the above-described application is not preferred, because no sufficient crosslinking occurs and, when used in the production of the thermoplastic polyolefin resin skin material of the present invention, the skin material may not be provided with sufficient surface heat resistance, chemical resistance and the like. A modification rate of higher than 60%, on the other hand, is not preferred either, because the possibility that demasked isocyanate groups would remain without any reaction may increase.

A description will hereinafter be made about the top coat layer, which characterizes the skin material according to the present invention, which is made of the thermoplastic polyolefin resin, and which can be formed with the resin composition composed, as a principal component, of the self-crosslinking polysiloxane-modified polyhydroxy polyurethane resin according to the present invention.

<Top Coat Layer>

In the present invention, a matting agent may be added in consideration of anti-glare properties or the like as needed depending on the application upon forming a top coat layer with the above-mentioned self-crosslinking polysiloxane-modified polyhydroxy polyurethane resin. As matting agents usable as described above, organic fine powders and inorganic fine powders can be mentioned. They can be used either singly or in a combination of two or more. No particular limitation is imposed on the organic fine powder or powders to be used as described above. Illustrative are acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles, and the like. As these powders, those having an average particle size in a range of from 0.1 to 10 μm are preferred. As their shapes, a spherical shape or a substantially spherical shape is preferred from the practical standpoint because the resulting coating film can be provided with particularly good matte properties.

On the other hand, inorganic fine powders usable as described above include talc, mica, calcium carbonate, barium sulfate, magnesium carbonate, clay, alumina, silica, carbon fibers, glass fibers, metal fibers, carbon black, titanium oxide, molybdenum, magnesium hydroxide, bentonite, graphite, and the like. As these powders, those having average particle sizes of 10 μm or smaller conform to the objects of the present invention and are suited, but the smaller as much as possible, the more preferred.

Such a matting agent as described above may be used in a range of from 1 to 150 parts by mass, preferably from 3 to 60 parts by mass per 100 parts by mass of the self-crosslinking polysiloxane-modified polyhydroxy polyurethane resin. A proportion of smaller than 1 parts by mass cannot obtain sufficient matte effect, while a proportion of greater than 150 parts by mass provides the resulting coating film with significantly lowered mechanical/physical properties. Proportions outside the above-described range are not preferred accordingly.

Upon forming the top coat layer on the thermoplastic polyolefin resin sheet in the present invention, a resin composition composed, as principal component, of the above-described self-crosslinking polysiloxane-modified polyhydroxy polyurethane resin, or depending on the application, a resin composition further containing a matting agent (these resin compositions will hereinafter be referred to simply as "the resin composition for skin material") is used. Upon forming a top coat layer, the resin composition may preferably be used in the form of an organic solvent solution or water dispersion. When the resin composition is used in the form of an organic solvent solution, it is preferred to use one or more of the following organic solvents. Illustrative are dimethylformamide, dimethyl sulfoxide, dimethyl acetamide, N-methylpyrrolidone, N-ethylpyrrolidone, and the like. The concentration of the resin in the organic solvent solution 100 mass % may preferably be from 3 to 60 mass %. A resin concentration of lower than 3 mass % is not preferred, because it may lead to inferior film-forming properties, and the resulting film may be insufficient in thickness and may hence be provided with insufficient strength. A resin concentration of higher than 60 mass %, on the other hand, is not preferred either, because such an excessively high resin concentration may lead to incomplete formation of a film after drying, and moreover, may raise such a problem that the organic solvent would remain in the resulting film.

When the resin composition for skin material composed, as a principal component, of the self-crosslinking polysiloxane-modified polyhydroxy polyurethane resin is used in the form of a water dispersion, on the other hand, it is preferred to use the resin as will be described hereinafter. First, the hydroxyl groups or NH groups in the self-crosslinking polysiloxane-modified polyhydroxy polyurethane resin are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion. As the acid anhydride to be used in the foregoing, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the self-crosslinking polysiloxane-modified polyhydroxy polyurethane resin may be in the form of a water dispersion emulsified with a surfactant in water by a method known per se in the art.

The resin composition for skin material, which is useful in the present invention, may contain one or more other resins, which are different from the self-crosslinking polysiloxane-modified polyhydroxy polyurethane resin, in addition to the self-crosslinking polysiloxane-modified polyhydroxy polyurethane resin to improve the spraying applicability or coating applicability to the thermoplastic polyolefin resin as the base material and the film-forming property. As such other resin or resins, conventionally-known various binder resins can be blended and used. As such other resin or resins to be blended and used, those which are chemically reactable with the polyisocyanate groups formed as a result of the removal of the masking agent from the self-crosslinking polysiloxane-modified polyhydroxy polyurethane resin are preferred, although even those having no reactivity can be also used in the present invention.

As these binder resins, binder resins which have been conventionally employed for skins of thermoplastic polyolefin resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. When such a binder resin or binder resins are used in combination, the binder resin or binder resins can be used in a range of from 5 to 90 parts by mass, more preferably from 10 to 60 parts or so by mass based on the self-crosslinking polysiloxane-modified polyhydroxy polyurethane resin composition according to the present invention.

In the resin composition for skin material, which is useful in the present invention, one or more of various additives for coating formulations, such as surface control agents, fluidity control agents, ultraviolet absorbers, dispersants and anti-settling agents, may be further added as needed.

<Thermoplastic Polyolefin Resin Sheet>

The skin material according to the present invention, which is made of the thermoplastic polyolefin resin, is composed of a thermoplastic polyolefin resin sheet and a top coat layer formed on the thermoplastic polyolefin resin sheet by coating the above-described resin composition for skin material directly or via a primer layer. As the thermoplastic polyolefin resin sheet, a sheet of one selected from the below-described materials can be used, for example, although no particular limitation is imposed. It is possible to use, for example, a sheet of at least one resin selected from the group consisting of thermoplastic polyolefin resins such as low-density to high-density polyethylenes (LDPE, LLDPE, HDPE, etc.), polypropylenes such as polypropylene and propylene-ethylene copolymer, ethylene-propylene rubber (EPR), ethylene-butene rubber (EBR), and ethylene-propylene-diene terpolymers (EPDM). Among such sheets, a sheet of a polypropylene resin or polyolefin-based thermoplastic elastomer is preferred because it has good pliability and elasticity along with excellent mechanical strength.

The thermoplastic polyolefin resin that makes up the sheet is inert at the surface thereof, and therefore, is inferior in the adhesiveness with a coating to the surface in many instances. It is, therefore, preferred to form a top coat layer by directly applying the above-mentioned resin composition for skin material after physically activating its surface by corona discharge treatment or the like or chemically activating its surface. As an alternative, it is preferred to form a top coat layer via a primer layer by applying the above-mentioned resin composition for skin material after applying a chlorinated polyolefin-based resin, a polyester-based resin and polyisocyanate compound, or a polyurethane resin and polyisocyanate compound on a base material sheet to form the primer layer.

<Production Process of Skin Material>

Using the resin composition for skin material, said resin composition containing the above-described self-crosslinking polysiloxane-modified polyhydroxy polyurethane resin of the present invention as a principal component and added with the matting agent as needed, the skin material according to the present invention, which is made of the thermoplastic polyolefin resin, can be obtained as will be described hereinafter. First, the above-mentioned resin composition for skin material is applied, by a known coating method such as brush coating, spray coating, roll coating, gravure coating or dip coating, onto a thermoplastic polyolefin resin sheet directly or after a primer layer is formed with the above-described compound or the like on the sheet. In the foregoing, the resin composition is applied to give a dry coat thickness of from 3 to 20 μm or so, and subsequent to drying, heat treatment is conducted at a temperature of from 80 to 170° C. so that a film can be readily formed as a top coat layer on the base material sheet. The sheet-like skin material according to the present invention, which has been formed as described above and is made of the thermoplastic polyolefin resin, is then formed into a desired shape by vacuum molding to provide it, for example, as a vehicle interior trim material or a home electric appliance member.

In the skin material according to the present invention, which is made of the thermoplastic polyolefin resin, the above-described specific self-crosslinking polysiloxane-modified polyhydroxy polyurethane resin is used as a material for forming the top coat layer. Therefore, the skin material according to the present invention is excellent in scratch resistance, abrasion resistance, chemical resistance and heat resistance, and moreover, can be provided with excellent uniform matte effect as needed.

The 5-membered cyclic carbonate polysiloxane compound employed in the synthesis of the resin for use in the present invention can incorporate and fix carbon dioxide in the resin because of the use of carbon dioxide as its production raw material. It is, therefore, possible to provide the skin material, which is made of the thermoplastic polyolefin resin, as an environment-responsive product which is also useful from the viewpoint of the reduction of carbon dioxide considered to be a cause of global warming and has been unavailable with conventional products.

EXAMPLES

The present invention will next be described in further detail based on specific production examples, examples and comparative examples, although the present invention shall not be limited to these examples. It is to be noted that the terms "parts" and "%" in the following examples are on a mass basis unless otherwise specifically indicated.

Production Example 1 (Production of Modifier)

While thoroughly stirring a 1:3 adduct of trimethylolpropane and hexamethylene diisocyanate ("COLONATE HL", trade name, product of Nippon Polyurethane Industry Co., Ltd.; NCO: 12.9%, solids content: 75%) (100 parts) and ethyl acetate (24.5 parts) at 100° C., ε-caprolactam (25.5 parts) was added, followed by a reaction for 5 hours. According to an infrared absorption spectrum (measured by "FT-720", HORIBA Ltd.; hereinafter equally measured) of the resulting modifier, an absorption of free isocyanate groups remained at 2,270 cm$^{-1}$. Upon quantification of those free isocyanate groups, they were found to amount to 1.8% at a solids content of 50% (cf. calculated value: 2.1%). The principal structure of the above-described modifier is presumed to be represented by the following formula.

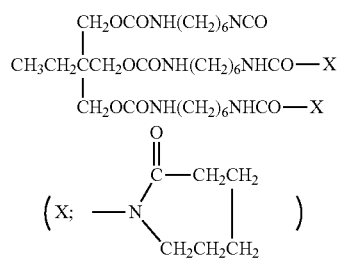

Production Example 2 (Production of Modifier)

While thoroughly stirring an adduct of hexamethylene diisocyanate and water ("DURANATE 24A-100", trade name, product of Asahi Kasei Corporation; NCO: 23.0%) (100 parts) and ethyl acetate (132 parts) at 80° C., methyl ethyl ketoxime (32 parts) was added, followed by a reaction for 5 hours. According to an infrared absorption spectrum of the resulting modifier, an absorption of free isocyanate groups remained at 2,270 cm$^{-1}$. Upon quantification of those free isocyanate groups, they were found to amount to 2.6% at a solids content of 50% (cf. calculated value: 2.9%). The principal structure of the above-described modifier is presumed to be represented by the following formula.

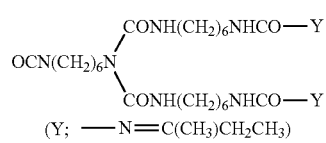

Production Example 3 (Production of Modifier)

While thoroughly stirring a 1:3 adduct of trimethylolpropane and tolylene diisocyanate ("COLONATE L", trade name, product of Nippon Polyurethane Industry Co., Ltd.; NCO: 12.5%, solids content: 75%) (100 parts) and ethyl acetate (67.3 parts) at 80° C., methyl ethyl ketoxime (17.3 parts) was added, followed by a reaction for 5 hours. According to an infrared absorption spectrum of the resulting modifier, an absorption of free isocyanate groups remained at 2,270 cm$^{-1}$. Upon quantification of those free isocyanate groups, they were found to amount to 2.0% at a solids content of 50% (cf. calculated value: 2.3%). The principal structure of the above-described modifier is presumed to be represented by the following formula.

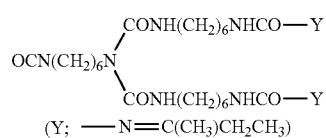

Production Example 4 (Production of 5-Membered Cyclic Carbonate Polysiloxane Compound)

To a reaction vessel equipped with a stirrer, thermometer, gas inlet tube and reflux condenser, a divalent epoxy-modified polysiloxane represented by the below-described formula (A) ("X-22-163", trade name, product of Shin-Etsu Chemical Co., Ltd.; epoxy equivalent: 198 g/mol) (100 parts), N-methylpyrrolidone (100 parts) and sodium iodide (1.2 parts) were added, followed by dissolution into a homogeneous solution. Subsequently, the solution was heated and stirred at 80° C. for 30 hours while bubbling carbon dioxide gas at a rate of 0.5 liter/minute.

Formula (A)

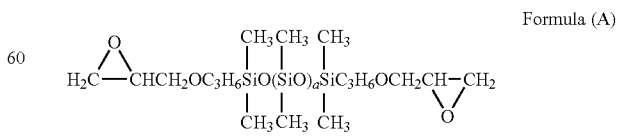

(a: a value to give a molecular weight of 396)

After completion of the reaction, n-hexane (100 parts) was added to the thus-obtained solution to dilute the same, the resulting solution was washed three times with purified water (80 parts, each) in a separatory funnel to remove N-methylpyrrolidone and sodium iodide. The n-hexane solution was dried over magnesium sulfate, and was then concentrated to obtain a 5-membered cyclic carbonate polysiloxane compound (1-A) in a colorless, clear and liquid form (yield: 89.7%).

In an infrared absorption spectrum of the thus-obtained reaction product (1-A), an absorption of carbonyl groups in a cyclic carbonate group, which did not exist in any raw material, was confirmed around 1,800 $cm^{-1}$. The number average molecular weight of the reaction product was 2,450 (polystyrene equivalent; by "GPC-8220", Tosoh Corporation). In the thus-obtained 5-membered cyclic carbonate polysiloxane compound (1-A), carbon dioxide was fixed as much as 18.1%.

Production Example 5 (Production of 5-Membered Cyclic Carbonate Polysiloxane Compound)

By conducting a reaction as in Production Example 4 except that a divalent epoxy-modified polysiloxane B represented by the below-described formula (B) ("KF-105", trade name, product of Shin-Etsu Chemical Co., Ltd.; epoxy equivalent: 485 g/mol) was used in place of the divalent epoxy-modified polysiloxane (A) used in Production Example 4, a 5-membered cyclic carbonate polysiloxane compound (1-B) (99 parts, yield: 91%) was obtained in a colorless, clear and liquid form.

Formula (B)

$$H_2C\underset{O}{\underset{\diagdown\diagup}{CH}}CH_2OC_3H_6SiO(SiO)_aSiC_3H_6OCH_2CH\underset{O}{\underset{\diagdown\diagup}{CH_2}}$$

(with $CH_3$ groups on Si)

(a: a value to give a molecular weight of 970)

The reaction product was identified by infrared absorption spectroscopy, GPC and NMR. In the thus-obtained 5-membered cyclic carbonate polysiloxane compound (1-B), carbon dioxide was fixed as much as 8.3%.

Example 1

Production of Self-Crosslinking Polysiloxane-Modified Polyhydroxy Polyurethane Resin A reaction vessel equipped with a stirrer, thermometer, gas inlet tube and reflux condenser was purged with nitrogen. To the reaction vessel, the 5-membered cyclic carbonate polysiloxane compound (1-A) (100 parts) obtained in Production Example 4 was added, and further, N-methylpyrrolidone was added to adjust the solids content to 35%, followed by dissolution into a homogeneous solution.

Hexamethylenediamine (23.9 parts) was then added, and the resulting mixture was stirred at a temperature of 90° C. for 10 hours so that a reaction was conducted until hexamethylenediamine became no longer detectable. The modifier of Production Example 1 was next added as much as 20 parts (solids content: 50%), followed by a reaction at 90° C. for 3 hours. Upon confirmation of disappearance of an absorption of isocyanate groups in an infrared absorption spectrum, the self-crosslinking polysiloxane-modified polyhydroxy polyurethane resin of this example was obtained in the form of a solution.

Examples 2 to 4

Production of Self-Crosslinking Polysiloxane-Modified Polyhydroxy Polyurethane Resins The self-crosslinking polysiloxane-modified polyhydroxy polyurethane resins of Examples 2 to 4, which are described in Table 1, were then obtained in the forms of solutions by combining the corresponding 5-membered cyclic carbonate polysiloxane compounds, amine compounds and modifiers as in Example 1 and reacting them in a similar manner as in Example 1.

Comparative Example 1

Production of Polysiloxane-Modified Polyhydroxy Polyurethane Resin

A polysiloxane-modified polyhydroxy polyurethane resin solution was used in the form of a solution as in Example 1 except that the modifier of Production Example 1, which was employed in Example 1, was not used.

TABLE 1

Compositions and Properties of Polysiloxane-modified Polyhydroxy Polyurethane Resins

|  | Example 1 | Example 2 | Example 3 | Example 4 | Comp. Ex.1 |
|---|---|---|---|---|---|
| 5-Membered cyclic carbonate polysiloxane compound (i) | 1-A | 1-A | 1-B | 1-B | 1-A |
| Amine compound (ii) | HMDA[1] | HMDA | HMDA | HMDA | HMDA |
| Molar ratio (i/ii) | 1.0 | 1.0 | 1.0 | 1.0 | 1.0 |
| Modifier | Production Example 1 | Production Example 2 | Production Example 2 | Production Example 3 | — |
| (Resin/modifier) solids content ratio | 100/10 | 100/15 | 100/10 | 100/15 | — |
| Solution viscosity (35% conc., MPa · s) | 1.9 | 2.2 | 2.0 | 2.3 | 1.5 |

TABLE 1-continued

Compositions and Properties of Polysiloxane-modified Polyhydroxy Polyurethane Resins

|  | Example 1 | Example 2 | Example 3 | Example 4 | Comp. Ex.1 |
|---|---|---|---|---|---|
| Number average molecular weight | 40,000 | 65,000 | 41,000 | 68,000 | 38,000 |
| Hydroxyl number (mgKOH/g) | 150 | 139 | 71 | 66 | 175 |
| Polysiloxane content (%) | 29 | 28 | 51 | 49 | 32 |
| Fixed amount of carbon dioxide (%)[2] | 13.1 | 12.6 | 6.2 | 6.0 | 14.5 |

[1] Hexamethylenediamine
[2] Calculated value

Comparative Example 2-1 (Production of Polyester Polyurethane Resin)

A polyester polyurethane resin for use in this comparative example was synthesized as will be described below. A reaction vessel equipped with a stirrer, thermometer, gas inlet tube and reflux condenser was purged with nitrogen. In the reaction vessel, polybutylene adipate (average molecular weight: approx. 2,000) (150 parts) and 1,4-butanediol (15 parts) were dissolved in a mixed organic solvent consisting of methyl ethyl ketone (200 parts) and dimethylformamide (50 parts). Subsequently, under thorough stirring at 60° C., a solution of hydrogenated MDI (methylene bis(1,4-cyclohexane)-diisocyanate) (62 parts) in dimethylformamide (171 parts) was gradually added dropwise, and after completion of the dropwise addition, a reaction was conducted at 80° C. for 6 hours.

The reaction mixture had a viscosity of 3.2 MPa·s (25° C.) at a solids content of 35%. A film obtained from the reaction mixture by the casting method had a breaking strength of 45 MPa, a breaking extension of 480%, and a thermal softening temperature of 110° C.

Comparative Example 2-2 (Production of Polyurethane Resin)

Similar to Comparative Example 2-1, polybutylene adipate (average molecular weight: approx. 2,000) (150 parts) and 1,4-butanediol (15 parts) were dissolved in a solvent consisting of 1,4-butanediol (15 parts) and dimethylformamide (250 parts). Subsequently, under thorough stirring at 60° C., a solution of hydrogenated MDI (62 parts) in dimethylformamide (171 parts) was gradually added dropwise, and after completion of the dropwise addition, a reaction was conducted at 80° C. for 6 hours. The reaction mixture had a viscosity of 3.2 MPa·s (25° C.) at a solids content of 35%. A film obtained from the reaction mixture had a breaking strength of 45 MPa, a breaking extension of 480%, and a thermal softening temperature of 110° C.

Comparative Example 3-1 (Production of Polysiloxane-Modified Polyurethane Resin)

A polysiloxane-modified polyurethane resin for use in this comparative example was synthesized as will be described below. Polydimethylsiloxanediol represented by the below-described formula (C) (average molecular weight: approx. 3,200) (150 parts) and 1,4-butanediol (10 parts) were added to a mixed organic solvent consisting of methyl ethyl ketone (200 parts) and dimethylformamide (50 parts). Subsequently, a solution of hydrogenated MDI (40 parts) in dimethylformamide (120 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture by the casting method had a breaking strength of 21 MPa, a breaking extension of 250%, and a thermal softening temperature of 135° C.

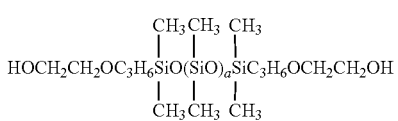

Formula (C)

(a: a value to give a molecular weight of 3,200)

Comparative Polymerization Example 3-2 (Production of Polysiloxane-Modified Polyurethane Resin)

Similar to Comparative Example 3-1, a polysiloxane-modified polyurethane resin for use in this Comparative Example was synthesized from a diol and an amine. Polydimethylsiloxanediol represented by the below-described formula (C) (average molecular weight: approx. 3,200) (150 parts) and 1,4-butanediol (10 parts) were added to dimethylformamide solvent (250 parts). Further, a solution of hydrogenated MDI (40 parts) in dimethylformamide (120 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

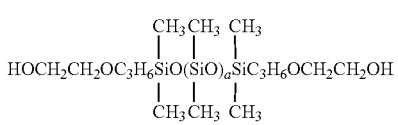

Formula (C)

(a: a value to give a molecular weight of 3,200)

Evaluation

From the respective resin solutions of Examples 1 to 4, Comparative Example 1, Comparative Example 2-1 and Comparative Example 3-1, films were produced by the casting method. With respect to each film so obtained, the below-described properties were measured and ranked. As casting conditions, after having been dried at 100° C. for 3 minutes, heat treatment was conducted at 160° C. for 30 minutes.

(Mechanical Properties) Tensile Strength, Elongation

With respect to each film, its mechanical properties (tensile strength, elongation) were measured following JIS K7311. The results are shown in Table 2.

(Thermal Softening Temperature)

With respect to each film, its thermal softening temperature was ranked following JIS K7206 (Vicat softening temperature measuring method). The results are shown in Table 2.

(Abrasion Resistance)

With respect to each film, its abrasion resistance was ranked following JIS K7311. The results are shown in Table 2.

(Coefficient of Friction)

With respect to each film, the coefficient of friction of the surface of the film was measured by a surface property tester (manufacture by Shinto Scientific Co., Ltd.). The results are shown in Table 2.

(Solvent Resistance)

Following JIS K5600-6-1, each film was observed for any change in external appearance after immersion for 10 minutes in toluene controlled at 50° C., whereby its solvent resistance was ranked. The results are shown in Table 2.

(Environmental Responsiveness)

The environmental responsiveness of each film was ranked "A" or "B" depending on whether or not carbon dioxide was fixed in it. The results are shown in Table 2.

were immersed in a 10% aqueous solution of DMF controlled at 25° C., so that the resins were solidified. After washing, drying was conducted under heat (150° C./10 minutes) to obtain artificial leathers having porous layers as sheets.

(Synthetic Leathers)

A base fabric sheet for imitation leathers was prepared by coating and drying a solution of a polyurethane-based resin ("LETHAMINE UD-6025", trade name, product of Dainichiseika Color & Chemicals Mfg., Co., Ltd.) as an adhesive layer on a woven fabric to give a dry coat thickness of 10 µm. On the other hand, the resin solutions obtained in Examples 1 to 4 and Comparative Examples 1, 2-2 and 3-2 were separately coated on sheets of release paper and dried under heat (150° C./10 minutes) to form films of approx. 15 µm thickness, respectively. The thus-obtained films were bonded to cut pieces of the above-obtained base fabric sheet to obtain synthetic leathers, respectively.

Evaluation

Using the respective imitation leathers obtained as artificial leathers and synthetic leathers as described above, ranking was performed by the below-described methods and standards. The results are collectively shown in Tables 3 and 4.

(Hand Feeling)

The hand feeling of each imitation leather was determined based on a hand touch feeling, and was ranked in accordance

TABLE 2

Ranking Results

| | Ex. 1 | Ex. 2 | Ex. 3 | Ex. 4 | Comp. Ex. 1 | Comp. Ex. 2-1 | Comp. Ex. 3-1 |
|---|---|---|---|---|---|---|---|
| Tensile strength (MPa) | 56 | 62 | 51 | 58 | 32.1 | 45 | 21 |
| Elongation (%) | 10 | 7 | 10 | 8 | 15 | 480 | 250 |
| Thermal softening temperature (° C.) | 205 | 210 | 204 | 210 | 118 | 110 | 135 |
| Abrasion resistance (mg) | 12 | 10 | 8 | 6 | 27 | 55 | 36 |
| Coefficient of friction | 0.110 | 0.105 | 0.103 | 0.100 | 0.123 | 0.612 | 0.133 |
| Solvent resistance | No change | No change | No change | No change | Swollen | Swollen | Swollen |
| Environmental responsiveness | A | A | A | A | A | B | B |

From the above-described results, sufficient crosslinking was confirmed to have proceeded in the respective films obtained using the resins of Examples 1 to 4. Further, the self-crosslinking polysiloxane-modified polyhydroxy polyurethane resins of Examples 1 to 4 were confirmed to show equal or better performance compared with the conventional polyester polyurethane resins and polysiloxane-modified polyurethane resins.

Examples 5 to 12 & Comparative Examples 4 to 9

Separately using, as coating formulations for imitation leathers, the resin solutions of Examples 1 to 4 and Comparative Examples 1, 2-2 and 3-2 as they were, imitation leathers of the examples and comparative examples were obtained by the below-described method. The thus-obtained imitation leathers were separately ranked as will be mentioned below, and the results are shown in Tables 3 and 4.

(Artificial Leathers)

The resin solutions of the polymerization examples and comparative examples were applied onto nonwoven fabrics made of polystyrene-polyester fibers to give a thickness of 1 mm, respectively. The thus-coated non-woven fabrics with the following standards. The rank "A" means a practicable level.

A: Soft

B: A little hard

C: Hard (Coefficient of Friction)

The coefficient of friction of the surface of each artificial leather obtained as described above was measured and was ranked by a surface property tester (manufacture by Shinto Scientific Co., Ltd.).

(Chemical Resistance)

Onto the surface of each synthetic leather obtained as described above, toluene was dropped. For allowing the surface to always remain in a wet state, the solvent was additionally dropped. One hour later, the solvent was wiped off. The dropped and wiped-off part was visually observed, and was ranked in accordance with the following standards.

A: No trace of dropping was observed at all on the coated surface.

B: A trace of dropping was slightly recognized, but it was not noticeable.

C: A trace of dropping was clearly recognized.
(Surface Abrasion Resistance)

Using a plane abrasion tester, each synthetic leather obtained as described above was rubbed by reciprocating No. 6 canvas under a load of 1 kgf. The number of reciprocations until occurrence of a scratch was counted.
A: 5,000 reciprocations or more
B: 2,000 reciprocations or more, but less than 5,000 reciprocations
C: Less than 2,000 reciprocations
(Thermal Softening Temperature)

The thermal softening temperature of the film, which had been obtained by conducting coating on a sheet of release paper and drying under heat (150° C./10 minutes) upon production of each of the above-described synthetic leathers, was measured following JIS K7206 (Vicat softening temperature measuring method).
(Environmental Responsiveness)

The environmental responsiveness of each imitation leather was ranked "A" or "B" depending on whether or not carbon dioxide was fixed in the used resin.

lations for skin materials (resin compositions), the compositions of which are described in Tables 5 and 6, were prepared. Using the thus-obtained coating formulations, skin materials of the examples and comparative examples, which were made of a thermoplastic polyolefin resin, were prepared as will be described below. The thus-obtained skin materials were ranked by the below-described methods.
(Formation Method of Top Coat Layers)

Onto a base material sheet of a thermoplastic polyolefin, which had been subjected to corona discharge treatment to activate its surface to a wetting index of 45 dyn/cm, chlorinated polypropylene ("SUPERCHLON", trade name, product of Nippon Paper Chemicals Co., Ltd.) was coated as a primer layer by a 120-mesh gravure roll to give a dry coat thickness of 3 μm, followed by drying at 100° C. for 2 minutes to form the primer layer. Onto cut pieces of the thus-formed coating film, the coating formulations for skin materials (resin compositions) prepared according to the compositions described in Table 5 and Table 6 were applied, respectively, by a 120-mesh gravure roll to give a dry coat thickness of 5 μm. The coating formulations so applied were dried at 150° C. for 3 minutes, and subsequent to aging at

TABLE 3

Compositions of Coating Formulations and Ranking Results (Artificial Leathers)

(Unit in upper section: parts)

|  | Examples | | | | Comparative Examples | | |
| --- | --- | --- | --- | --- | --- | --- | --- |
|  | 5 | 6 | 7 | 8 | 4 | 5 | 6 |
| Resin solution of Example 1 | 100 | — | — | — | — | — | — |
| Resin solution of Example 2 | — | 100 | — | — | — | — | — |
| Resin solution of Example 3 | — | — | 100 | — | — | — | — |
| Resin solution of Example 4 | — | — | — | 100 | — | — | — |
| Resin soln. of Comp. Ex. 1 | — | — | — | — | 100 | — | — |
| Resin soln. of Comp. Ex. 2-2 | — | — | — | — | — | 100 | — |
| Resin soln. of Comp. Ex. 3-2 | — | — | — | — | — | — | 100 |
| Hand feeling | A | A | A | A | B | A | A |
| Coefficient of friction | 0.165 | 0.172 | 0.151 | 0.154 | 0.378 | 0.507 | 0.155 |
| Environmental responsiveness | A | A | A | A | A | B | B |

TABLE 4

Compositions of Coating Formulations and Ranking Results (Synthetic Leathers)

(Unit in upper section: parts)

|  | Examples | | | | Comparative Examples | | |
| --- | --- | --- | --- | --- | --- | --- | --- |
|  | 9 | 10 | 11 | 12 | 7 | 8 | 9 |
| Resin solution of Example 1 | 100 | — | — | — | — | — | — |
| Resin solution of Example 2 | — | 100 | — | — | — | — | — |
| Resin solution of Example 3 | — | — | 100 | — | — | — | — |
| Resin solution of Example 4 | — | — | — | 100 | — | — | — |
| Resin soln. of Comp. Ex. 1 | — | — | — | — | 100 | — | — |
| Resin soln. of Comp. Ex. 2-2 | — | — | — | — | — | 100 | — |
| Resin soln. of Comp. Ex. 3-2 | — | — | — | — | — | — | 100 |
| Hand feeling | A | A | A | A | B | A | A |
| Chemical resistance | A | A | A | A | C | C | C |
| Surface abrasion resistance | A | A | A | A | C | C | B |
| Thermal softening point (° C.) | 195 | 210 | 200 | 210 | 98 | 110 | 135 |
| Environmental responsiveness | A | A | A | A | A | B | B |

Examples 13 to 20 & Comparative Examples 10 to 15

Separately using the resin solutions of Examples 1 to 4 and Comparative Examples 1, 2-1 and 3-1, coating formu- 80° C. for 24 hours, the resulting skin materials were molded by a vacuum molding machine equipped with a convex mold controlled at 160° C. at a surface thereof, whereby molded products formed of the respective skin materials were obtained.

Evaluation

The molded products formed of the respective skin materials, which were obtained as described above, were ranked for moldability, gloss (luster), coefficient of friction, adhesiveness, scratch resistance, oil resistance, chemical resistance, surface abrasion resistance, and environmental responsiveness by the below-described methods and standards. Especially, the surfaces (top coat layers) of the molded products formed of the respective sheets were ranked. The results are shown in Table 5 and Table 6.

(Moldability)

The surface of each sheet after its vacuum molding was visually observed and was ranked in accordance with the following standards.
- A: Good (No molding cracking or whitening phenomenon)
- B: Bad (Either molding cracking or whitening phenomenon was observed)

(Gloss Value (Luster))

Following JIS K5600, the luster of the surface of each sheet after its vacuum molding was measured by a gloss meter. Ranking was made by setting one having a gloss value of 1.2 or smaller (standard value required in the relevant business field) to pass.

(Coefficient of Friction)

The coefficient of friction of the surface of each sheet after its vacuum molding was measured by a surface property tester (manufacture by Shinto Scientific Co., Ltd.). A coefficient of friction of not higher than 0.2 was set to be desired, because a lower coefficient of friction leads to a smaller abnormal noise (squeak noise) by friction between the surfaces of vehicle interior trim materials.

(Adhesiveness)

On the surface (top coat layer) of each sheet after its vacuum molding, a cross-cut cellophane tape peeling test was conducted. The adhesiveness of the sheet was ranked in accordance with the following standards.
- A: Good (No peeled portion in the coated surface)
- B: Bad (Peeled area at the coated surface)

(Scratch Resistance)

The surface of each sheet after its vacuum molding was rubbed with a nail. By visually observing whether or not a trace of scratch or whitening had occurred, the scratch resistance of the sheet was ranked in accordance with the following standards.
- A: Good (Nail scratch or whitening was hardly noticeable at the coated surface)
- B: Bad (Nail scratch or a trace of whitening was clearly noticeable at the coated surface)

(Oil Resistance)

The surface of each sheet after its vacuum molding was coated over an area of 2 cm in radius with beef tallow (Nacalai Tesque, Inc.), and the sheet so coated was left over for 5 days in an atmosphere of 80° C. Subsequently, the beef tallow was removed. On the area where the coated beef tallow had been removed, a cross-cut cellophane tape peeling test was conducted to rank the oil resistance of the sheet in accordance with similar standards as in the case of scratch resistance.

(Chemical Resistance)

Onto the surface of each sheet after its vacuum molding, ethanol was dropped. For allowing the surface to always remain in a wet state, the solvent was additionally dropped. One hour later, the solvent was wiped off. A portion of the sheet, where the dropped solvent had been wiped off, was visually observed, and the chemical resistance of the sheet was ranked in accordance with the following standards.
- A: No trace of dropping was observed at all on the coated surface.
- B: A slight trace of dropping was recognized, but it was not noticeable.
- C: A clear trace of dropping was recognized.

(Surface Abrasion Resistance)

Using a plane abrasion tester, the surface of each sheet after its vacuum molding was rubbed by reciprocating No. 6 canvas under a load of 1 kgf. The number of reciprocations until occurrence of a scratch was counted. The surface abrasion resistance of the sheet was ranked in accordance with the following standards.
- A: 5,000 reciprocations or more
- B: 2,000 reciprocations or more, but less than 5,000 reciprocations
- C: Less than 2,000 reciprocations (Environmental Responsiveness)

The environmental responsiveness of each skin material was ranked "A" or "B" depending on whether or not carbon dioxide was fixed in the resin used for the formation of the top coat layer of the skin material.

TABLE 5

Compositions of Coating Formulations for Skin Materials of Examples and Ranking Results of Molded Products

| | (Unit in upper section: parts) | | | | | | | |
|---|---|---|---|---|---|---|---|---|
| Examples | 13 | 14 | 15 | 16 | 17 | 18 | 19 | 20 |
| Primer | Chlorinated polypropylene | | | | | | | |
| Resin solution of Example 1 | 100 | 100 | — | — | — | — | — | — |
| Resin solution of Example 2 | — | — | 100 | 100 | — | — | — | — |
| Resin solution of Example 3 | — | — | — | — | 100 | 100 | — | — |
| Resin solution of Example 4 | — | — | — | — | — | — | 100 | 100 |
| Matting agents Resin particles[a] | 35 | 25 | 35 | 25 | 35 | 25 | 35 | 25 |
| Silica[b] | — | 10 | — | 10 | — | 10 | — | 10 |
| Moldability | A | A | A | A | A | A | A | A |
| Gloss value | 0.9 | 0.7 | 0.9 | 0.7 | 1.0 | 0.8 | 1.0 | 0.7 |
| Coefficient of friction | 0.131 | 0.122 | 0.140 | 0.128 | 0.118 | 0.103 | 0.112 | 0.105 |
| Adhesiveness | A | A | A | A | A | A | A | A |
| Scratch resistance | A | A | A | A | A | A | A | A |
| Oil resistance | A | A | A | A | A | A | A | A |
| Chemical resistance | A | A | A | A | A | A | A | A |

TABLE 5-continued

Compositions of Coating Formulations for Skin Materials of Examples and Ranking Results of Molded Products (Unit in upper section: parts)

| Examples | 13 | 14 | 15 | 16 | 17 | 18 | 19 | 20 |
|---|---|---|---|---|---|---|---|---|
| Surface abrasion resistance | A | A | A | A | A | A | A | A |
| Environmental responsiveness | A | A | A | A | A | A | A | A |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)

TABLE 6

Compositions of Coating Formulations for Skin Materials of Comparative Examples and Ranking Results of Molded Products (Unit in upper section parts)

| Comparative Examples | 10 | 11 | 12 | 13 | 14 | 15 |
|---|---|---|---|---|---|---|
| Primer | Chlorinated polypropylene | | | | | |
| Resin solution of Comp. Ex. 1 | 100 | 100 | — | — | — | — |
| Resin solution of Comp. Ex. 2-1 | — | — | 100 | 100 | — | — |
| Resin solution of Comp. Ex. 3-1 | — | — | — | — | 100 | 100 |
| Matting agents — Resin particles[a] | 35 | 25 | 35 | 25 | 35 | 25 |
| Matting agents — Silica[b] | — | 10 | — | 10 | — | 10 |
| Moldability | A | A | A | A | A | A |
| Gloss value | 0.9 | 0.7 | 0.9 | 0.7 | 1.0 | 0.9 |
| Coefficient of friction | 0.351 | 0.303 | 0.460 | 0.402 | 0.145 | 0.132 |
| Adhesiveness | A | B | B | C | B | C |
| Scratch resistance | B | C | B | C | B | C |
| Oil resistance | B | B | B | B | B | B |
| Chemical resistance | C | C | C | C | C | C |
| Surface abrasion resistance | B | C | B | C | B | C |
| Environmental responsiveness | A | A | B | B | B | B |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)

INDUSTRIAL APPLICABILITY

According to the present invention as described above, there is provided a self-crosslinking polysiloxane-modified polyhydroxy polyurethane resin, which is a useful material considered to contribute to the resolution of problems such as global warming and resource depletion, and is effectively usable for industrial applications. Described more specifically, there is provided a self-crosslinking polysiloxane-modified polyhydroxy polyurethane resin that products molded or otherwise formed with the resin can be also sufficiently satisfactory in performance such as heat resistance, lubricity, non-tackiness, abrasion resistance and chemical resistance although they are environment-responsive products which contain carbon dioxide incorporated therein and can contribute to the reduction of warming gas. Therefore, the self-crosslinking polysiloxane-modified polyhydroxy polyurethane resin is also expected to find active utility from the standpoint of the conservation of the global environment.

An imitation leather according to the present invention is provided with outstanding performance including excellent scratch resistance, abrasion resistance, chemical resistance and heat resistance in combination with pliability and lubricity as the effects of polysiloxane segments, because owing to the use of a resin composition composed as a principal component of the self-crosslinking polysiloxane-modified polyhydroxy polyurethane resin, free isocyanate groups formed as a result of demasking under heat of masked isocyanate groups contained in the structure of the resin, and hydroxyl groups in the resin react to form a crosslinked resin. As a result, it becomes possible to provide an imitation leather product, which is responsive to environmental conservation and has not been realized with conventional products. Consequently, it is possible to contribute to the resolution of problems, such as global warming and resource depletion, which have become a worldwide issue in recent years.

According to the present invention, a resin composition containing the specific self-crosslinking polysiloxane-modified polyhydroxy polyurethane resin is used for a top coat layer on a surface of a thermoplastic polyolefin resin sheet as a base material. A molded or otherwise formed product, which is obtained from the sheet, is provided at a surface thereof with excellent performance that is excellent in scratch resistance, abrasion resistance, chemical resistance and heat resistance, and further, can also be excellent in uniform matte effect as needed, because the isocyanate groups demasked under heat and the free hydroxyl groups in the self-crosslinking polysiloxane-modified polyhydroxy polyurethane resin react to form a self-crosslinked film as a top coat layer (outermost layer). As a result, it becomes possible to provide a skin material, which is responsive to environmental conservation and has not been realized with conventional products. The use of skin materials can hence be enlarged, thereby making it possible to contribute to the resolution of problems such as global warming and resource depletion, which have become a worldwide issue in recent years.

The invention claimed is:
1. A self-crosslinking polysiloxane-modified polyhydroxy polyurethane resin, comprising in a structure thereof:
polysiloxane-modified polyhydroxy polyurethane resin having polysiloxane segments; and
masked isocyanate groups,
wherein the polysiloxane-modified polyhydroxy polyurethane resin having the polysiloxane segments is a reaction product of a 5-membered cyclic carbonate polysiloxane compound represented by following formula (1) and a diamine compound:

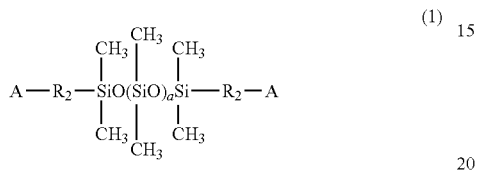

wherein A means

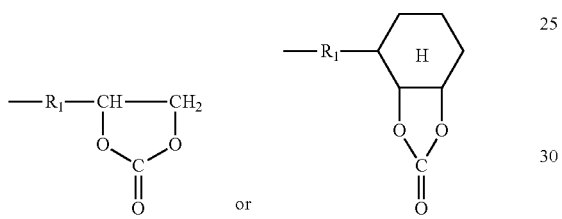

in which $R_1$ means an alkylene group which has from 1 to 12 carbon atoms and may be connected therein via an element of O, S or N and/or $-(C_2H_4O)_b-$, $R_2$ means a direct bond or an alkylene group having from 2 to 20 carbon atoms, $R_2$ may be linked to an alicyclic group or aromatic group, b stands for a number of from 1 to 300, and a stands for a number in a range from 1 to 300,
the masked isocyanate groups are present in at least one portion attached to the polysiloxane-modified polyhydroxy polyurethane resin so as to form the self-crosslinking polysiloxane-modified polyhydroxy polyurethane resin, and
the attached portion is bound to the polysiloxane-modified polyhydroxy polyurethane resin at at least one free hydroxyl group having been present in the polysiloxane-modified polyhydroxy polyurethane resin via a bond formed as a result of a reaction between (i) at least one free isocyanate group having been present in the attached portion and (ii) the at least one free hydroxyl group having been present in the polysiloxane-modified polyhydroxy polyurethane resin and bound to a carbon atom in a main chain of the polysiloxane-modified polyhydroxy polyurethane resin.
2. The self-crosslinking polysiloxane-modified polyhydroxy polyurethane resin according to claim 1,
wherein the 5-membered cyclic carbonate polysiloxane compound is a reaction product of an epoxy-modified polysiloxane compound and carbon dioxide, and
the 5-membered cyclic carbonate polysiloxane compound contains, in a structure thereof, carbon dioxide in a range from 1 to 25 mass %.
3. The self-crosslinking polysiloxane-modified polyhydroxy polyurethane resin according to claim 1, wherein a content of the polysiloxane segments in the resin is in a range from 1 to 75 mass % relative to a siloxane content in resin molecules.
4. The self-crosslinking polysiloxane-modified polyhydroxy polyurethane resin according to claim 1,
wherein the masked isocyanate groups are reaction products of organic polyisocyanate groups in an organic polyisocyanate compound and a masking agent, and
when subjected to heat treatment, the masked isocyanate groups are demasked and form free isocyanate groups, which are reactable with hydroxyl groups in the structure of the self-crosslinking polysiloxane-modified polyhydroxy polyurethane resin such that the resin undergoes self-crosslinking.
5. The resin according to claim 4,
wherein the organic polyisocyanate compound having the organic polyisocyanate groups is at least one compound selected from the group consisting of 1,4-tetramethylene diisocyanate, 1,5-pentamethylene diisocyanate, 1,6-hexamethylene diisocyanate, 3-isocyanatomethyl-3,5,5-trimethylcyclohexyl isocyanate, 4,4'-dicyclohexylmethane diisocyanate, tolylene diisocyanate, 4,4'-diphenylmethane diisocyanate, 1,5-nephthalene diisocyanate, tolidine diisocyanate, xylylene diisocyanate, and adducts thereof.
6. The resin according to claim 4,
wherein the masking agent is at least one agent selected from the group consisting of alcohol-based masking agents, phenol-based masking agents, active methylene-based masking agents, acid amide-based masking agents, imidazole-based masking agents, urea based-masking agents, oxime-based masking agents, and pyridine-based masking agents.
7. A resin material comprising;
the self-crosslinking polysiloxane-modified polyhydroxy polyurethane resin according to claim 1; and
another binder resin blended therewith.
8. An imitation leather comprising:
a base fabric; and
a resin composition composed, as a principal component, of the self-crosslinking polysiloxane-modified polyurethane resin according to claim 1,
where in the resin composition is impregnated in or laminated on the base fabric.
9. The imitation leather according to claim 8, wherein the resin composition further comprises another resin different from the self-crosslinking polysiloxane-modified polyurethane resin.
10. A skin material made of a thermoplastic polyolefin resin, comprising:
a thermoplastic polyolefin resin sheet; and
a first top coat layer formed directly on the resin sheet or a second top coat layer formed on a primer layer that is formed on the resin sheet,
wherein the first and second top coat layers are formed of a resin composition, as a principal component, comprising the self-crosslinking polysiloxane-modified polyhydroxy polyurethane resin according to claim 1.
11. The skin material according to claim 10,
wherein the self-crosslinking polysiloxane-modified polyhydroxy polyurethane resin is formed by modifying, with a modifier, the polysiloxane-modified polyhydroxy polyurethane resin as the reaction product of the 5-membered cyclic carbonate polysiloxane compound and the diamine compound.

12. The skin material according to claim 10,
wherein each of the top coat layers is formed of a composition comprising the self-crosslinking polysiloxane-modified polyhydroxy polyurethane resin and a material,
the material comprises one fine powder or a combination of two or more fine powders selected from the group consisting of organic fine powders and inorganic fine powders,
the material is added to the composition as a matting agent at a proportion from 1 to 150 parts by mass per 100 parts by mass of the self-crosslinking polysiloxane-modified polyhydroxy polyurethane resin.

13. The skin material according to claim 10,
wherein each of the top coat layers is formed of a resin composition comprising, in addition to the self-crosslinking polysiloxane-modified polyhydroxy polyurethane resin, another resin different from the self-crosslinking polysiloxane-modified polyhydroxy polyurethane resin.

14. A process for producing the self-crosslinking polysiloxane-modified polyhydroxy polyurethane resin according to claim 1,
reacting a modifier comprising the at least one free isocyanate group and the at least one of the masked isocyanate groups, with the polysiloxane-modified polyhydroxy polyurethane resin having the at least one free hydroxyl group bound to the carbon atom in the main chain thereof, so as to form the bond between (i) the at least one free isocyanate group of the modifier forming the attached portion and (ii) the at least one hydroxyl group bound to the main chain of the polysiloxane-modified polyhydroxy polyurethane resin, so that the self-crosslinking polysiloxane-modified polyhydroxy polyurethane resin comprising in the structure thereof the masked isocyanate groups is formed.

15. The process according to claim 14,
wherein the 5-membered cyclic carbonate polysiloxane compound is a reaction product of an epoxy-modified polysiloxane compound and carbon dioxide, and
the polysiloxane-modified polyhydroxy polyurethane resin as a reaction product of the 5-membered cyclic carbonate polysiloxane compound and the diamine compound incorporates in its structure the carbon dioxide in a range from 1 to 25 mass % in the polysiloxane-modified polyhydroxy polyurethane resin.

16. The process according to claim 14, wherein the modifier is a reaction product of an organic polyisocyanate compound and a masking agent.

\* \* \* \* \*